(12) United States Patent
Wang

(10) Patent No.: US 11,839,953 B2
(45) Date of Patent: Dec. 12, 2023

(54) AUTOMOBILE CALIBRATION DEVICE

(71) Applicant: AUTEL INTELLIGENT TECHNOLOGY CORP., LTD., Guangdong (CN)

(72) Inventor: Xiaolong Wang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 644 days.

(21) Appl. No.: 17/088,175

(22) Filed: Nov. 3, 2020

(65) Prior Publication Data
US 2021/0069872 A1   Mar. 11, 2021

Related U.S. Application Data

(63) Continuation of application No. PCT/CN2019/083597, filed on Apr. 22, 2019.

(30) Foreign Application Priority Data

Apr. 20, 2018 (CN) .......................... 201810362137.X

(51) Int. Cl.
*G01B 5/02* (2006.01)
*B25B 11/00* (2006.01)
*G01B 5/00* (2006.01)

(52) U.S. Cl.
CPC ............ *B25B 11/00* (2013.01); *G01B 5/0025* (2013.01); *G01B 5/02* (2013.01)

(58) Field of Classification Search
CPC .................................................. G01B 5/0025
(Continued)

(56) References Cited

U.S. PATENT DOCUMENTS 3,180,205 A * 4/1965 Pickholtz ................ G01S 17/08
342/120
4,444,496 A * 4/1984 Dale, Jr. .............. G01B 11/275
33/228
(Continued)

FOREIGN PATENT DOCUMENTS

CN       2178969 Y     10/1994
CN     102590796 A      7/2012
(Continued)

OTHER PUBLICATIONS

The Extended Eurogean Search Regort 19788788.8 dated Apr. 20, 2021.
(Continued)

*Primary Examiner* — George B Bennett

(57) ABSTRACT

The present invention relates to the field of automobile maintenance and device calibration technologies, and discloses a clamping apparatus and an automobile calibration device. The clamping apparatus includes a fixing plate, a fixing block and a tension knob. The fixing block includes a fixing block body and a locking spring piece. The fixing block body is installed on the fixing plate. A receiving cavity is enclosed by the fixing block body and the fixing plate. The locking spring piece is located in the receiving cavity. The tension knob is installed on the fixing block body. The tension knob is capable of rotating relative to the fixing block body, to extend inside the receiving cavity and to abut against the locking spring piece. When a to-be clamped and calibrated apparatus is inserted in the receiving cavity, the tension knob may push the locking spring piece to abut against the to-be clamped and calibrated apparatus. Because the locking spring piece is in surface contact with the to-be clamped and calibrated apparatus, a friction between the locking spring piece and the to-be clamped and calibrated
(Continued)

apparatus increases, so that the locking spring piece may firmly abut against the to-be clamped and calibrated apparatus.

20 Claims, 20 Drawing Sheets

(58) Field of Classification Search
USPC .............................. 33/203, 203.18, 288, 600
See application file for complete search history.

(56) References Cited

U.S. PATENT DOCUMENTS

| | | | | |
|---|---|---|---|---|
| 4,730,923 | A * | 3/1988 | Kosugi | G01M 11/067 356/121 |
| 5,058,286 | A * | 10/1991 | Chisum | G01B 5/207 33/608 |
| 5,274,433 | A * | 12/1993 | Madey | G01B 11/275 33/288 |
| 5,507,101 | A | 4/1996 | Mason | |
| 5,752,113 | A | 5/1998 | Borden | |
| 5,809,658 | A * | 9/1998 | Jackson | G01B 11/2755 33/203.18 |
| 6,498,959 | B1 * | 12/2002 | January | G01B 11/275 356/138 |
| 6,598,308 | B1 * | 7/2003 | Johansson | G01B 5/207 33/608 |
| 6,842,238 | B2 * | 1/2005 | Corghi | G01B 11/2755 356/139.09 |
| 7,121,011 | B2 * | 10/2006 | Murray | G01B 11/2755 33/203.18 |
| 7,376,492 | B2 * | 5/2008 | Srack | G01B 5/0025 701/1 |
| 9,326,406 | B2 | 4/2016 | Brandt | |
| 10,049,443 | B2 * | 8/2018 | Bartos | H04N 13/204 |
| 10,234,275 | B1 * | 3/2019 | Liu | G01B 21/08 |
| 10,776,949 | B2 * | 9/2020 | Haven | G06T 7/74 |
| 2013/0325252 | A1 | 12/2013 | Schommer et al. | |
| 2018/0031364 | A1 * | 2/2018 | Kallay | G01B 11/02 |

FOREIGN PATENT DOCUMENTS

| | | |
|---|---|---|
| CN | 203573166 U | 4/2014 |
| CN | 103894853 A | 7/2014 |
| CN | 204142765 U | 2/2015 |
| CN | 204171582 U | 2/2015 |
| CN | 204269818 U | 4/2015 |
| CN | 103267281 B | 6/2015 |
| CN | 105241674 A | 1/2016 |
| CN | 205402122 U | 7/2016 |
| CN | 107672594 A | 2/2018 |
| CN | 107678004 A | 2/2018 |
| CN | 107843883 A | 3/2018 |
| CN | 107856649 A | 3/2018 |
| CN | 108453646 A | 8/2018 |
| CN | 208289741 U | 12/2018 |
| ES | 2133242 A1 | 9/1999 |

OTHER PUBLICATIONS

International Search Report dated Jul. 25, 2019; PCT/CN2019/083597.
The first Chinese Office Action dated Aug. 30, 2023; Appln. No. 201810362137.X (English Translation not available on Global Dossier).

* cited by examiner

AUTOMOBILE CALIBRATION DEVICE

This application is a continuation of International Patent Application No. PCT/CN2019/083597 filed on Apr. 22, 2019, which claims priority to Chinese Patent Application No. 201810362137.X filed on Apr. 20, 2018, both of which are incorporated by reference herein in their entireties.

BACKGROUND

Technical Field

The present application relates to the field of automobile maintenance and device calibration technologies, and in particular, to an automobile calibration device having a clamping apparatus.

Related Art

In the field of automobile maintenance, for example, during calibration of an advanced driver assistant system (ADAS), a calibration apparatus needs to be installed on an automobile calibration device, to calibrate in-vehicle assistance driving components, such as a camera.

For different automobile models or different calibration requirements, different calibration apparatuses need to be changed frequently, and the calibration apparatuses need to be locked tightly and secured. Currently, common structures are locking by using a C-type snap ring and abutting tightly by rotating a screw. The two structures have the following defects:
1. The C-type snap ring may slip, and is inconvenient to be assembled due to a small gap during an assembly process.
2. In the manner of abutting tightly by using the screw, there is only one fulcrum used for securing, which easily leads to a location deviation. In addition, if the calibration apparatus is an appearance component, the surface of the appearance component is easily damaged.

SUMMARY

Embodiments of the present invention provides a clamping apparatus and an automobile calibration device having the clamping apparatus, to resolve the technical problems in the prior art that installation is not firm and inconvenient, and installation accuracy is poor when a calibration apparatus is installed on the automobile calibration device.

To resolve the foregoing technical problems, the embodiments of the present invention provide the following technical solutions:

A clamping apparatus includes: a fixing plate, a fixing block and a tension knob. The fixing block includes a fixing block body and a locking spring piece. The fixing block body is installed on the fixing plate. A receiving cavity is enclosed by the fixing block body and the fixing plate. The locking spring piece is located in the receiving cavity. The tension knob is installed on the fixing block body. The tension knob is capable of rotating relative to the fixing block body, to extend inside the receiving cavity and to abut against the locking spring piece.

Optionally, the clamping apparatus includes a magnetic element. The magnetic element is installed on the fixing block body. The magnetic element is located in the receiving cavity, and is configured to absorb the locking spring piece.

Optionally, the fixing block body includes a side wall, a bottom wall and a connecting wall, where
the bottom wall connects the side wall and the connecting wall;
two connecting walls are respectively connected to two opposite sides of the side wall, the two connecting walls being further respectively connected to two opposite sides of the bottom wall;
the two connecting walls and the bottom wall are installed on the fixing plate; and
the side wall, the bottom wall, the connecting wall and the fixing plate jointly enclose the receiving cavity.

Optionally, the side wall is provided with a groove. The groove is configured to receive the locking spring piece.

Optionally, an inner wall of the groove is provided with a fixing through hole and a receiving groove, where
the fixing through hole is a threaded hole, the tension knob passing through the fixing through hole and the tension knob mating with the fixing through hole by threads; and
the receiving groove receives the magnetic element.

Optionally, there are two receiving grooves, the two receiving grooves being arranged in a vertical direction and the two receiving grooves being respectively located on two sides of the fixing through hole; and
there are two magnetic elements, each magnetic element being received in a corresponding receiving groove.

Optionally, one side of the side wall close to the bottom wall is perpendicularly connected to the bottom wall, the other side of the side wall away from the bottom wall inclining in a direction away from the fixing plate, so that a width of one side of the connecting wall close to the bottom wall is less than a width of the other side of the connecting wall away from the bottom wall.

Optionally, a width of a bottom of the receiving cavity is less than a width of a port of the receiving cavity.

To resolve the foregoing technical problems, the embodiments of the present invention further provide the following technical solutions:

An automobile calibration device includes a bracket apparatus and the foregoing clamping apparatus. A fixing plate of the clamping apparatus is installed on the bracket apparatus.

Optionally, the automobile calibration device further includes a location adjusting apparatus, which is installed on the bracket apparatus, and is movable in a vertical direction relative to the bracket apparatus; and the fixing plate is installed on the bracket apparatus by using the location adjusting apparatus.

Optionally, the automobile calibration device further includes a driving assembly, configured to drive the location adjusting apparatus to move in a vertical direction relative to the bracket apparatus.

Optionally, the location adjusting apparatus includes:
a sliding member, where the sliding member is installed on the bracket apparatus, and is movable in a vertical direction relative to the bracket apparatus;
a supporting member, where the supporting member is movably installed on the sliding member, the fixing plate being installed on the supporting member and one of the sliding member and the supporting member including a rack gear; and
an adjusting member, where the adjusting member includes a gear, the gear meshing with the rack gear and when rotating, the gear being capable of driving the rack gear to move horizontally, so that the supporting member moves horizontally relative to the sliding member, to drive the clamping apparatus to move horizontally relative to the sliding member.

Optionally, the location adjusting apparatus includes a connecting assembly. The supporting member is installed on the sliding member by using the connecting assembly.

Optionally, the connecting assembly includes a linear slide rail and a slide rail fixing block, one of the linear slide rail and the slide rail fixing block being installed on the sliding member and the other one of the linear slide rail and the slide rail fixing block being installed on the supporting member, where
  the linear slide rail is disposed in a horizontal direction; and
  the slide rail fixing block is sleeved on the linear slide rail, the linear slide rail being slidable in a horizontal direction relative to the slide rail fixing block.

Optionally, two slide rail fixing blocks are arranged in a horizontal direction, both the two slide rail fixing blocks being sleeved on the linear slide rail.

Optionally, the adjusting member includes a rod body, a knob portion and a gear, where
  the rod body passes through the sliding member, the rod body being movably installed on the sliding member and the rod body being capable of rotating relative to the sliding member; and
  the gear and the knob portion are respectively disposed on two ends of the rod body.

Optionally, the rack gear is strip-shaped and disposed in a horizontal direction, the rack gear comprising a plurality of gear tooth disposed in a vertical direction; and
  the gear is a spur gear, the gear meshing with the gear tooth of the rack gear.

Optionally, the automobile calibration device further includes a sliding apparatus. The sliding apparatus is installed on the fixing plate.

Optionally, the sliding apparatus includes a guide rail and a sliding assembly, where
  the guide rail is installed on the fixing plate; and
  the sliding assembly is installed on the guide rail, the sliding assembly being movable horizontally relative to the guide rail.

Optionally, the guide rail includes a first surface and a second surface that are perpendicular to each other, the first surface being provided with a first sliding groove, the second surface being provided with a second sliding groove, and the first sliding groove and the second sliding groove being disposed in parallel;
  the sliding assembly includes a plate body, a first sliding member and a second sliding member, the first sliding member and the second sliding member being installed on the plate body; and
  the first sliding member is movably installed on the first sliding groove, the first sliding member being movable along the first sliding groove, the second sliding member being movably installed on the second sliding groove and the second sliding member being movable along the second sliding groove, so that the plate body is slidable along the guide rail.

Optionally, the sliding apparatus further includes a mounting assembly. The mounting assembly is installed on the sliding assembly, configured to mount a calibration assistance device.

Compared with the prior art, the locking spring piece is located in the receiving cavity. The tension knob is capable of rotating relative to the fixing block body, to extend inside the receiving cavity and to abut against the locking spring piece. When a to-be clamped and calibrated apparatus is inserted in the receiving cavity, the tension knob may push the locking spring piece to abut against the to-be clamped and calibrated apparatus. Because the locking spring piece is in surface contact with the to-be clamped and calibrated apparatus, a friction between the locking spring piece and the to-be clamped and calibrated apparatus increases, so that the locking spring piece may firmly abut against the to-be clamped and calibrated apparatus, and assembly accuracy of the locking spring piece and the to-be clamped and calibrated apparatus is reduced, which helps quickly assembly the to-be clamped and calibrated apparatus on the clamping apparatus.

BRIEF DESCRIPTION OF THE DRAWINGS

Exemplary descriptions of one or more embodiments are provided through accompanying drawings corresponding to the one or more embodiments. These exemplary descriptions do not constitute any limitation on the embodiments. Elements having identical reference numerals in the drawings represent similar elements. Unless particularly stated, figures in the accompanying drawings do not constitute any proportional limitation.

DETAILED DESCRIPTION

For ease of understanding the present application, the present invention is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", "right", "inner", "outer" and similar expressions used in this specification are merely used for the purpose of description.

Unless otherwise defined, meanings of all technical and scientific terms used in this specification are the same as that usually understood by a person skilled in the technical field to which the present application belongs. The terms used in the specification of the present invention are merely intended to describe specific implementations rather than limit the present invention. The term "and/or" used in this specification includes any or all combinations of one or more related listed items.

In addition, technical features involved in different embodiments of the present invention described below may be combined as long as the technical features do not conflict with each other.

Figure 1:
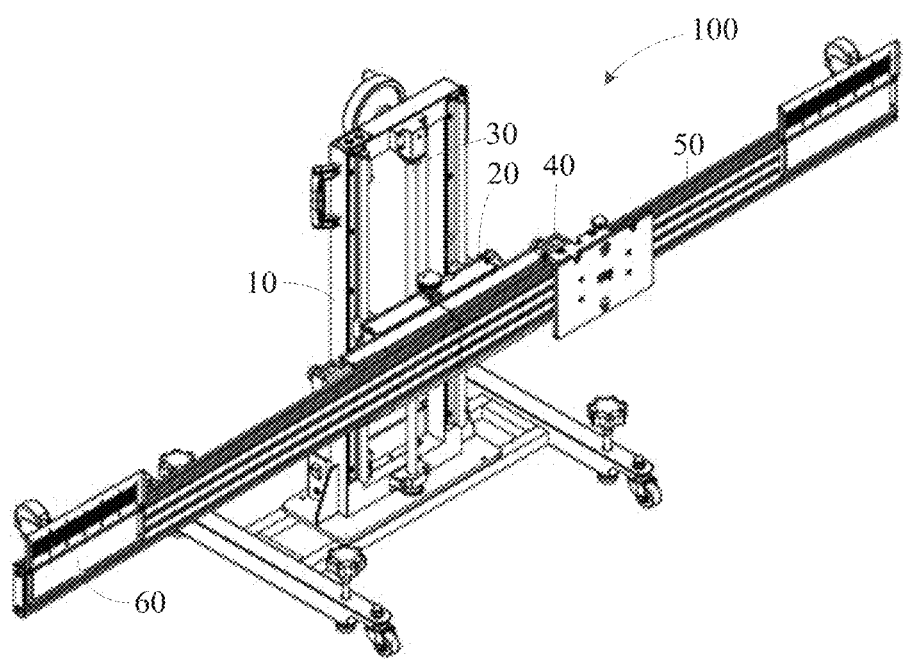
FIG. 1 is a schematic structural diagram of an automobile calibration device according to an embodiment of the present invention.

Referring to FIG. 1, an embodiment of the present invention provides an automobile calibration device 100, including a bracket apparatus 10, a location adjusting apparatus 20, a driving apparatus 30, a clamping apparatus 40, a sliding apparatus 50 and a scale apparatus 60. The location adjusting apparatus 20 is installed on the bracket apparatus 10. The location adjusting apparatus 20 is movable in a vertical direction relative to the bracket apparatus 20. The driving apparatus 30 connects the bracket apparatus 10 and the location adjusting apparatus 20. The driving apparatus 30 is configured to drive the location adjusting apparatus 20 to move in a vertical direction relative to the bracket apparatus 10. The clamping apparatus 40 is installed on the location adjusting apparatus 20 and is configured to clamp a vehicle calibration apparatus, for example, configured to calibrate a calibration apparatus of a lane keeping system. The sliding apparatus 50 is installed on the location adjusting apparatus 20 by using the clamping apparatus 40. The location adjusting apparatus 20 is configured to adjust a horizontal position of the sliding apparatus 50. The scale apparatus 60 is installed on the sliding apparatus 50 and is configured to assist in calibrating a vehicle central line.

Figure 2:
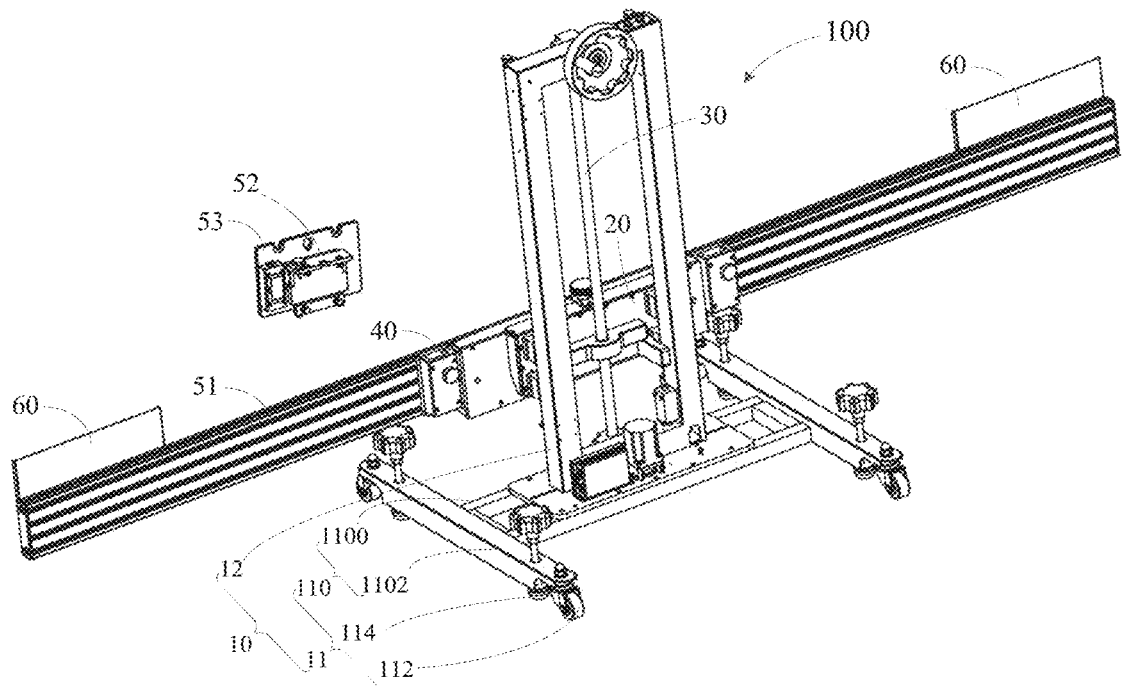
FIG. 2 is a schematic structural diagram of another angle of the automobile calibration device shown in FIG. 1.

Referring to FIG. 2, the bracket apparatus 10 includes a base bracket 11 and a vertical bracket 12. One end of the vertical bracket 12 is connected to the base bracket 11 and the base bracket 11 supports the vertical bracket 12.

The base bracket 1 includes a base bracket body 110, a roller 112 and a height adjusting member 114. The base bracket body 110 is roughly of an I shape, including a load bearing structure 1100 and two side frames 1102. To reduce weight, a plurality of hollow areas is formed on the load bearing structure 1100 and two ends of the load bearing structure 1100 are respectively connected to one of the side frames 1102.

The roller 112 is installed on bottom surfaces of the side frames 1102 and is configured to easily move the base bracket 11. In this embodiment, the roller 112 is a universal shifting roller, so that the base bracket 11 can move to the front, rear, left and right. There are four rollers 112 and two ends of each side frame 1102 are separately provided with one roller 112. It can be understood that, in some other embodiments, the shape of the base bracket body 110 may change according to an actual demand, but is not limited to the I shape. For example, the base bracket body 110 may be a rectangle. There may be more or fewer rollers 112 according to the actual demand, provided that there are at least three rollers 112.

The height adjusting member 114 is installed on the side frames 1102 and is configured to adjust a height of the base bracket body 110. In this embodiment, the height adjusting member 114 is an adjusting hand wheel and there are four adjusting hand wheels. The four adjusting hand wheels 114 are distributed in rectangular pattern, the two ends of each side frame 1102 are separately provided with one adjusting hand wheel 114. The four adjusting hand wheels 114 may adjust an overall horizontal height and an incline angle of the base bracket body 110 through cooperation. It can be understood that, the height adjusting member 114 may be other apparatuses whose height may be adjusted. There may be more height adjusting members 114 according to the actual demand, provided that there are at least three height adjusting members 114.

Figure 3:
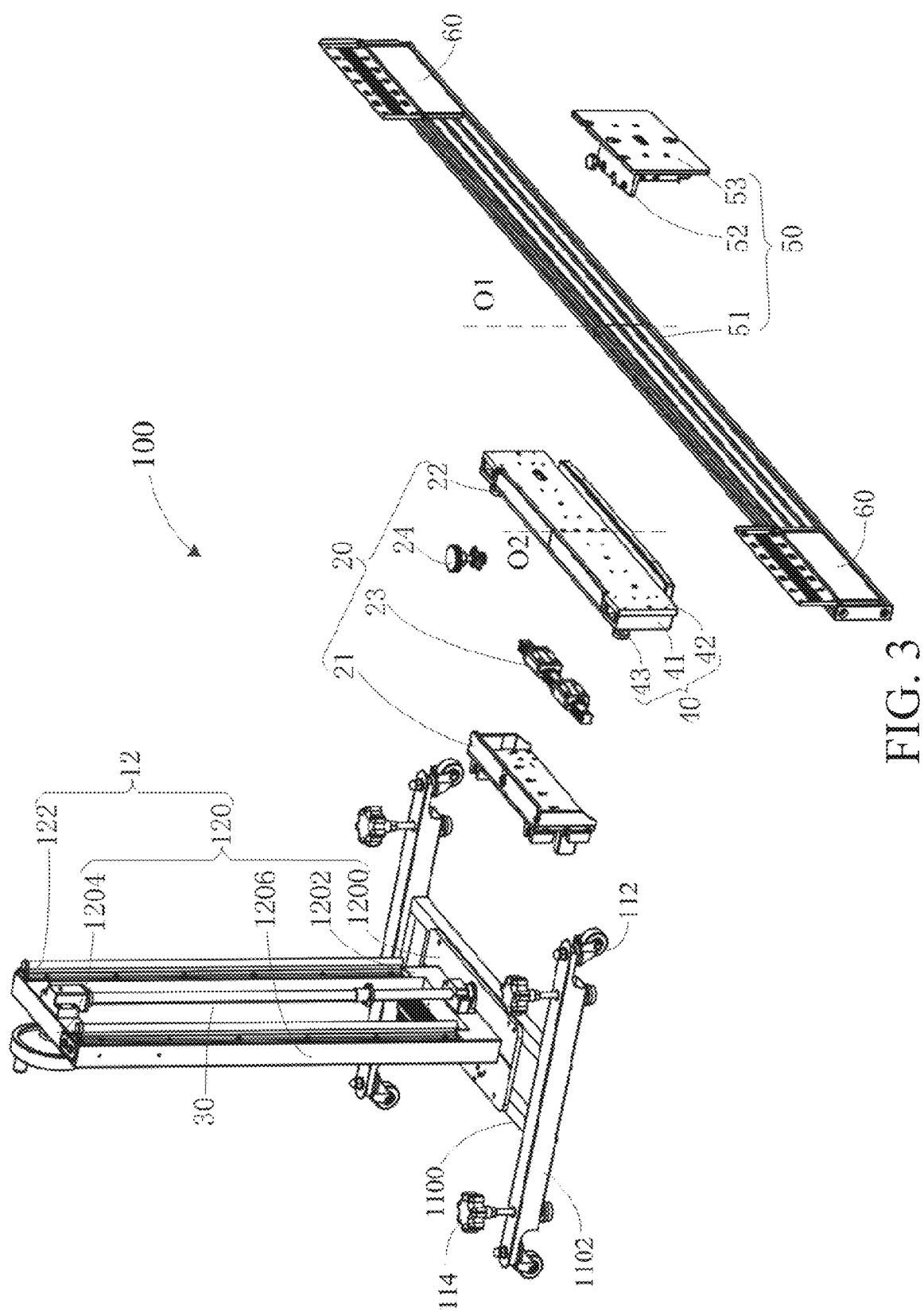
FIG. 3 is an exploded view of the automobile calibration device shown in FIG. 1.

Referring to FIG. 3, the vertical bracket 12 is installed on an upper surface of the load bearing structure 1100 and includes a vertical bracket body 120 and an elevating guide rail 122 installed on the vertical bracket body 120.

The vertical bracket body 120 includes an installation plate 1200, an installation groove body 1202, a roof beam 1204 and two vertical beams 1206. The installation plate 1200 is installed on the upper surface of the load bearing beam 1100. The installation plate 1200 is provided with an inspection port 1208 (shown in FIG. 7). The installation groove body 1202 is locked on an upper surface of the installation plate 1200. The inspection port 1208 is in communication with the installation groove body 1202. The roof beam 1204 and the two vertical beams 1206 are of hollow structures. One end of each vertical beam 1206 is connected to the roof beam 1204 and the other end of each vertical beam 1206 is connected to the installation groove body 1202. The installation groove body 1202, the roof beam 1204 and the two vertical beams 1206 form a rectangular structure. The insides of the installation groove body 1202, the roof beam 1204 and the two vertical beams 1206 are in mutual communication, which forms a wiring groove structure (not shown in the figure). The installation groove body 1202 is provided with a wiring port (not shown in the figure). The wiring port is in communication with the wiring groove structure.

Two elevating guide rails 122 are respectively installed on the two vertical beams 1206. The elevating guide rails 122 are configured to guide the location adjusting apparatus 20 to move in a vertical direction. The elevating guide rails 122 are vertical rods, which are disposed in a vertical direction. The two elevating guide rails 122 are disposed in a vertical direction and are spaced by a preset distance. Each elevating guide rail 122 is installed on a side surface corresponding to the vertical beam 1206. It can be understood that, in some other embodiments, there may be more or fewer elevating guide rails 122 according to an actual situation. For example, there may be one or three elevating guide rails 122.

The location adjusting apparatus 20 is movably installed on the two elevating guide rails 122 and is movable in a vertical direction relative to the two elevating guide rails 122. The location adjusting apparatus 20 includes a sliding member 21, a supporting member 22, a connecting assembly 23 and an adjusting member 24. The sliding member 21 is movably installed on the elevating guide rail 122 and is movable in a vertical direction relative to the elevating guide rail 122. The supporting member 22 is installed on the sliding member 21 by using the connecting assembly 23, is movable in a horizontal direction relative to the sliding member 21, and is configured to support the clamping apparatus 40. The adjusting member 24 connects the sliding member 21 and the supporting member 22 and is configured to adjust a horizontal position of the supporting member 22.

Figure 4:
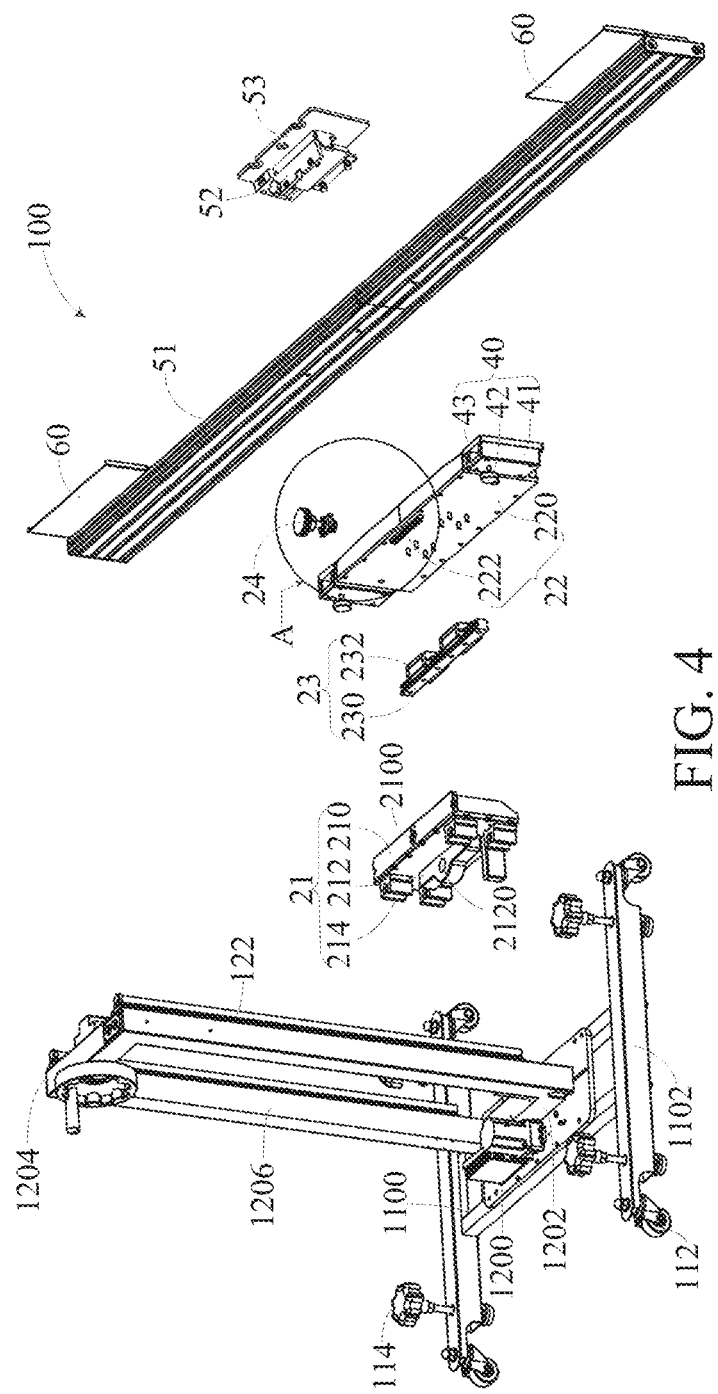
FIG. 4 is an exploded view of another angle of the automobile calibration device shown in FIG. 1.
Figure 5:
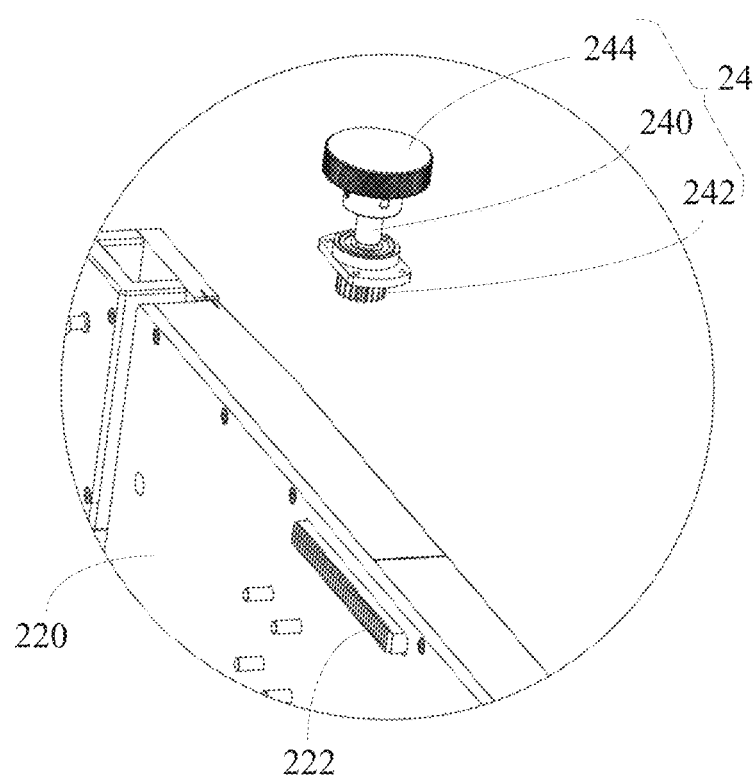
FIG. 5 is an enlarged partial diagram of section A in FIG. 4.

Referring to FIG. 4 and FIG. 5 together, the sliding member 21 includes a sliding member body 210, a slider 212 and a guiding block 214. The sliding member body 210 is roughly a cube and is provided with an installation through hole 2100, the installation through hole 2100 being configured to install the adjusting member 24. The slider 212 is fixedly installed on the sliding member body 210 and is provided with a threaded through hole 2120, the threaded through hole 2120 being vertically disposed along the central axis. The guiding block 214 is fixedly installed on the sliding member body 210. The guiding block 214 and the slider 212 are located on a same side as the sliding member body 210. There are four guiding blocks 214. Two guiding blocks 214 are located on one side of the slider 212, are arranged in a vertical direction and are configured to be sleeved on one of the elevating guide rails 122. The other two guiding blocks 214 are located on the other side of the slider 212, are also arranged in the vertical direction and are configured to be sleeved on the other elevating guide rail 122. Each two guiding blocks 214 are sleeved on one corresponding elevating guide rail 122, so that the location adjusting apparatus 20 is smoothly slidable along the elevating guide rail 122 in a vertical direction relative to the elevating guide rail 122.

It can be understood that, in some other embodiments, the quantity of the guiding blocks 214 may be changed according to an actual demand, but is not limited to four, provided that there is at least one guiding block 214. For example, if there is one guiding block 214 and there is also one elevating guide rail 122, one guiding block 214 is sleeved on one elevating guide rail 122. For another example, if there are two guiding blocks 214, which are respectively disposed on two opposite sides of the slider 212, and there are also two elevating guide rails 122, each guiding block 214 is sleeved on one corresponding elevating guide rail 122.

The supporting member 22 is movably installed on the sliding member body 210 and is horizontally slidable relative to the sliding member body 210. The supporting member 22 includes a supporting member body 220 and a rack gear 222. The supporting member body 220 is roughly a cube. The rack gear 222 is fixedly installed on the supporting member body 220. The rack gear 222 is disposed between the supporting member body 220 and the supporting member body 210 and is configured to adjust a horizontal position of the supporting member 22 by mating with the adjusting member 24. The rack gear 222 is strip-shaped and disposed in a horizontal direction and includes a plurality of gear tooth disposed in a vertical direction.

The connecting assembly 23 includes a linear slide rail 230 and a slide rail fixing block 232. The linear slide rail 230 is disposed in a horizontal direction and is fixedly installed on the sliding member body 210. Two slide rail fixing blocks 232 are fixedly installed on the supporting member body 220. The two slide rail fixing blocks 232 are arranged in a horizontal direction. The two slide rail fixing blocks 232 are sleeved on the linear slide rail 230. The linear slide rail 230 is slidable in a horizontal direction relative to the slide rail fixing block 232.

In this embodiment, the supporting member 22 is installed on the sliding member 21 by using the connecting assembly 23, so that the supporting member 22 is movably installed on the sliding member 21, that is, the supporting member 22 is movable relative to the sliding member 21. It can be understood that, in some other embodiments, as long as the supporting member 22 is movable in a horizontal direction relative to the sliding member 21, the supporting member 22 may be installed on the sliding member 21 in other connecting manners, such as a turbine and worm mechanism or a belt pulley mechanism.

It can be understood that, in some other embodiments, the installation positions of the linear slide rail 230 and the slide rail fixing block 232 may be exchanged, that is, the linear slide rail 230 is disposed in a horizontal direction and is fixedly installed on the supporting member body 220. However, the two slide rail fixing blocks 232 are fixedly installed on the sliding member body 210 and the two slide rail fixing blocks 232 are sleeved on the linear slide rail 230.

It can be understood that, in some other embodiments, the quantity of the slide rail fixing blocks 232 is not limited to two. The quantity of the slide rail fixing blocks 232 may be changed according to an actual demand, provided that there is at least one slide rail fixing block 232. For example, there is one slide rail fixing block 232.

The adjusting member 24 includes a rod body 240, a gear 242 and a knob portion 244. The rod body 240 passes through the installation through hole 2100, the rod body 240 is movably installed on the sliding member body 210, and the rod body 240 may rotate relative to the sliding member body 210. The gear 242 and the knob portion 244 are respectively installed on two ends of the rod body 240. The gear 242 meshes with the rack gear 222. When the rod body 240 rotates relative to the sliding member body 210, the gear 242 drives the rack gear 222 to move horizontally, so that the supporting member 22 is driven to move horizontally relative to the sliding member 21. The knob portion 244 is located outside the sliding member body 210 and is configured to make it convenient for a user to hold and rotate the adjusting member 24.

It can be understood that, in some other embodiments, the installation positions of the adjusting member 24 and the rack gear 222 may be exchanged, that is, the adjusting member 24 may be installed on the supporting member body 220. The rack gear 222 is fixedly installed on the sliding member body 210 and the rack gear 222 is disposed in a horizontal direction.

In this embodiment, the linear slide rail 230 is disposed in a horizontal direction. The rack gear 222 is strip-shaped and disposed in a horizontal direction and includes a plurality of gear tooth disposed in a vertical direction. The gear 242 is a spur gear. These structures enable the supporting member 22 to be movable in a horizontal direction relative to the sliding member 21. It can be understood that, in some other embodiments, according to an actual demand, the linear slide rail 230 may be disposed in a preset direction, the two slide rail fixing blocks 232 are arranged in the preset direction, and the linear slide rail 230 may be slidable in the preset direction relative to the slide rail fixing block 232. The rack gear 222 is strip-shaped and is disposed in the preset direction. Therefore, when the gear 242 rotates, the rack gear 222 may be driven to move in the preset direction, so that the supporting member 22 is movable in the preset direction relative to the sliding member 21.

In this embodiment, the gear 242 is a spur gear. The rack gear 222 includes a plurality of gear tooth disposed in a vertical direction. According to the cooperation between the gear 242 and the gear tooth of the rack gear 222, the supporting member 22 is horizontally movable relative to the sliding member 21 smoothly and precisely. It can be understood that, in some other embodiments, the gear 242 may be a helical gear. The rack gear 222 may include a plurality of gear tooth disposed in an inclined way. According to the cooperation between the gear 242 and the gear tooth of the rack gear 222, the supporting member 22 is horizontally movable relative to the sliding member 21 smoothly and precisely.

Figure 6:
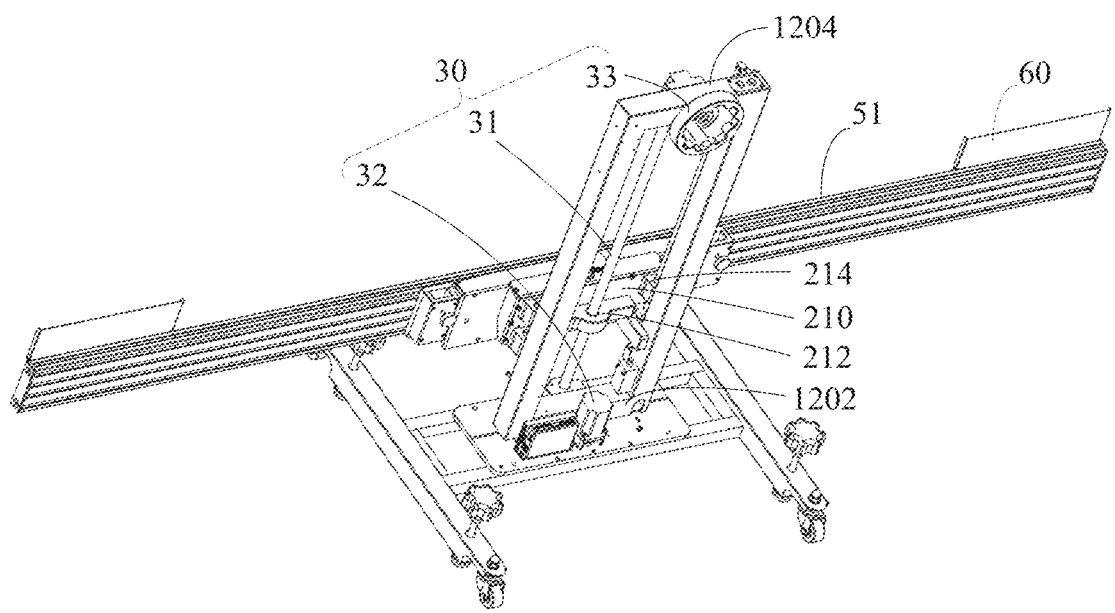
FIG. 6 is a schematic structural diagram of the automobile calibration device shown in FIG. 1, where a sliding assembly and a mounting assembly of the automobile calibration device are omitted.

Referring to FIG. 6, the driving apparatus 30 includes a transmission mechanism 31, a first driving mechanism 32 and a second driving mechanism 33. The first driving mechanism 32 and the second driving mechanism 33 are both connected to the transmission mechanism 31. The first driving mechanism 32 is configured to drive the transmission mechanism 31 to move. The second driving mechanism 33 is also configured to drive the transmission mechanism 31 to move. The transmission mechanism 31 is configured to drive the location adjusting apparatus 20 to move in a vertical direction relative to the bracket apparatus 10.

Figure 7:
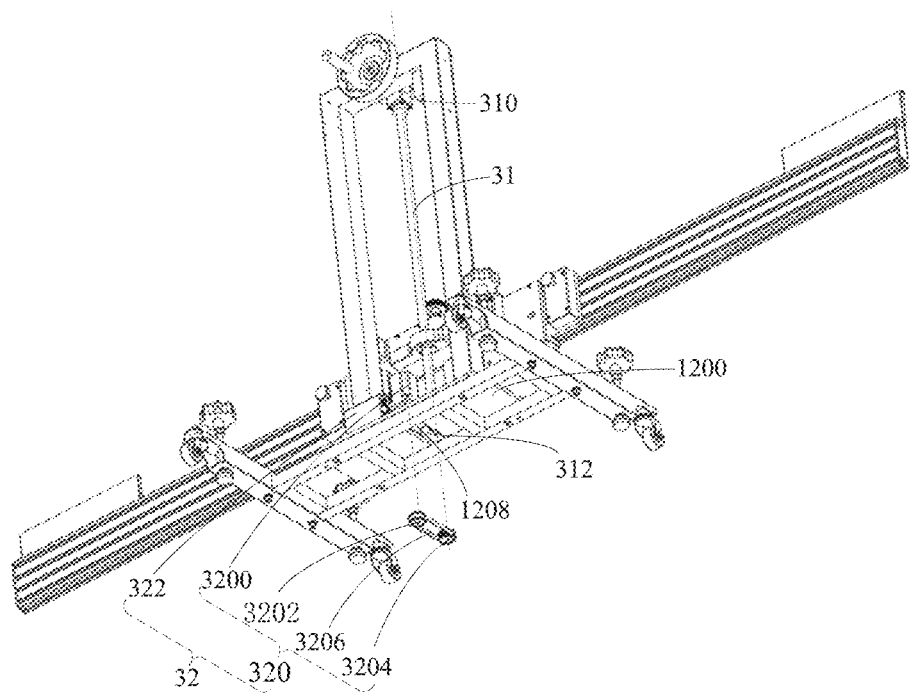
FIG. 7 is a schematic structural diagram of another angle of the automobile calibration device shown in FIG. 1, where a sliding assembly and a mounting assembly of the automobile calibration device are omitted.
Figure 8:
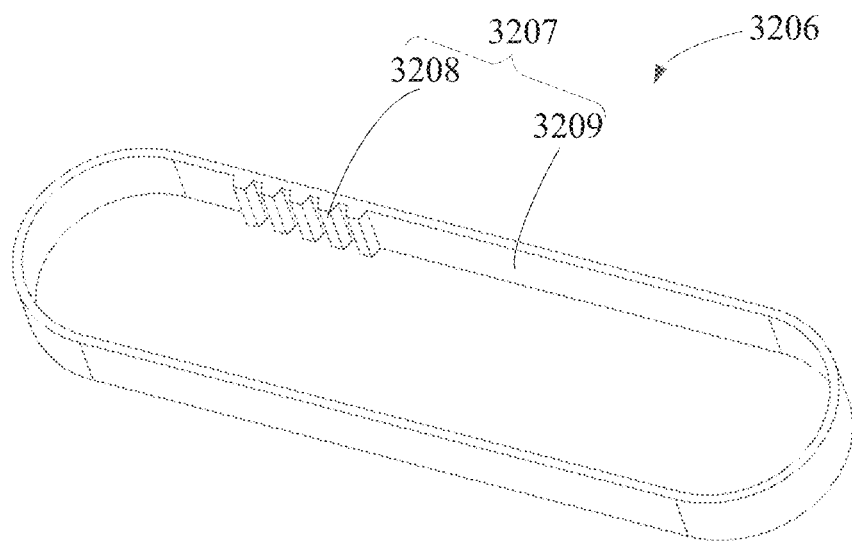
FIG. 8 is a schematic structural diagram of a drive belt of a motor assembly of the automobile calibration device shown in FIG. 7.

Referring to FIG. 7 and FIG. 8 together, in this embodiment, the transmission mechanism 31 is an elevating screw rod 31. Two ends of the elevating screw rod 31 are provided with a first shaft base 310 and a second shaft base 312. The first shaft base 310 is fixedly installed on the roof beam 1204. The second shaft base 312 is fixedly installed on the installation groove body 1202. The elevating screw rod 31 is disposed vertically and the elevating screw rod 31 may rotate around the central axis thereof. The elevating screw rod 31 passes through the threaded through hole 2120 and the elevating screw rod 31 mates with the threaded through hole 2120 by threads. When the elevating screw rod 31 rotates around the central axis thereof, the slider 212 may be driven to rise or fall, so as to drive the location adjusting apparatus 20, the clamping apparatus 40, the sliding apparatus 50 and the scale apparatus 60 to rise or fall. It should be noted that, according to the threaded mating of the elevating screw rod 31 and the threaded through hole 2120, in one aspect, the location adjusting apparatus 20 may rise and fall gently and stably. In another aspect, because the location adjusting apparatus 20 has a certain mass, the elevating screw rod 31 and the threaded through hole 2120 implement a self-locking function, to automatically prevent the location adjusting apparatus 20 from sliding downward.

It can be understood that, according to an actual situation, the transmission mechanism 31 is not limited to the elevating screw rod 31. In some other embodiments, the transmission mechanism 31 may further be a gear set, a belt pulley mechanism, a turbine and worm mechanism or a sprocket mechanism.

It can be understood that, the sliding member 21 and the connecting assembly 23 that bear the supporting member 21 may be omitted. That is, the slider 212 and the guiding block 214 may be installed on the supporting member 22, so that the supporting member 22 is directly installed on the elevating screw rod 31 and the elevating guide rail 122. The supporting member 21 is installed on the bracket apparatus 10 and is movable in a vertical direction relative to the bracket apparatus 10. The following trigger apparatus 3229 may also be directly installed on the supporting member 21. When the supporting member 21 moves in a vertical direction, the trigger apparatus 3229 may trigger the following limit switch 3225.

The first driving mechanism 32 is an electric drive mechanism, configured to drive the elevating screw rod 31 to rotate around the central axis thereof. The first driving mechanism 32 includes a motor assembly 320, a control assembly 322 and a power supply assembly (not shown in the figure). The motor assembly 320 is configured to drive the elevating screw rod 31 to rotate around the central axis thereof. The control assembly 322 is configured to control the motor assembly 320 to drive the elevating screw rod 31 to rotate around the central axis thereof. The power supply assembly is configured to supply power for the motor assembly 320 and the control assembly 322.

The motor assembly 320 includes a motor 3200, a first timing pulley 3202, a second timing pulley 3204 and a driving belt 3206. The motor 3200 is fixedly installed on an upper surface of the installation plate 1200. The motor 3200 is a stepping motor. It can be understood that, in some other embodiments, the motor 3200 may be another control motor such as a servo motor. The first timing pulley 3202 is located in the inspection port 1208. The first timing pulley 3202 is fixedly installed on a rotating shaft of the motor 3200 and the first timing pulley 3202 and the rotating shaft of the motor 3200 are coaxially disposed. One end of the elevating screw rod 31 passes through the second shaft base 312 and the inspection port 1208. The second timing pulley 3204 is located in the inspection port 1208. The second timing pulley 3204 is fixedly installed on the elevating screw rod 31 and the second timing pulley 3204 and the elevating screw rod 31 are coaxially disposed. The first timing pulley 3202 and the second timing pulley 3204 are spaced by a preset distance. When the motor 3200 rotates, the first timing pulley 3202 drives the second timing pulley 3204 to rotate by using the driving belt 3206, so that the elevating screw rod 31 rotates around the central axis thereof. When the motor 3200 rotates in a first rotational direction, the location adjusting apparatus 20 rises in a vertical direction relative to the bracket apparatus 10; and when the motor 3200 rotates in a second rotational direction, the location adjusting apparatus 20 falls in a vertical direction relative to the bracket apparatus 10. The first rotational direction and the second rotational direction are opposite.

The driving belt 3206 is sleeved on the first timing pulley 3202 and the second timing pulley 3204. When the first timing pulley 3202 rotates, the first timing pulley 3202 drives the second timing pulley 3204 to rotate by using the driving belt 3206. A peripheral surface of the first timing pulley 3202 and a peripheral surface of the second timing pulley 3204 are both provided with gear tooth. The driving belt 3206 includes an assembly surface 3207. The gear tooth of the first timing pulley 3202 and the gear tooth of the second timing pulley 3204 are both in contact with the assembly surface 3207. The assembly surface 3207 includes a gear teeth area 3208 and a non-gear teeth area 3209. The gear teeth area 3208 is provided with gear tooth. The gear teeth area 3208 may mesh and mate with the first timing pulley 3202 and the second timing pulley 3204. The non-gear teeth area 3209 may be in contact with and mate with the first timing pulley 3202 and the second timing pulley 3204. When the motor 3200 rotates and the gear teeth area 3208 meshes and mates with the first timing pulley 3202, or the gear teeth area 3208 meshes and mates with the second timing pulley 3204, the first timing pulley 3202 and the second timing pulley 3204 move synchronously, and a rate of the second timing pulley 3202 is a first preset rate value. When the motor 3200 rotates and the first timing pulley 3202 and the second timing pulley 3204 are only in contact with and mate with the non-gear teeth area 3209, due to factors such as slipping, the non-gear teeth area 3209 enables the first timing pulley 3202 and the second timing pulley 3204 to move asynchronously, and the rate of the second timing pulley 3202 is a second preset rate value. The first preset rate value is greater than the second preset rate value. It should be noted that, by dividing the gear teeth area 3208 and the non-gear teeth area 3209 on the assembly surface 3207, the rate of the second gear teeth 3204 is controlled while a rate of the first gear teeth 3202 remains unchanged, to achieve the purpose of deceleration.

Figure 9:
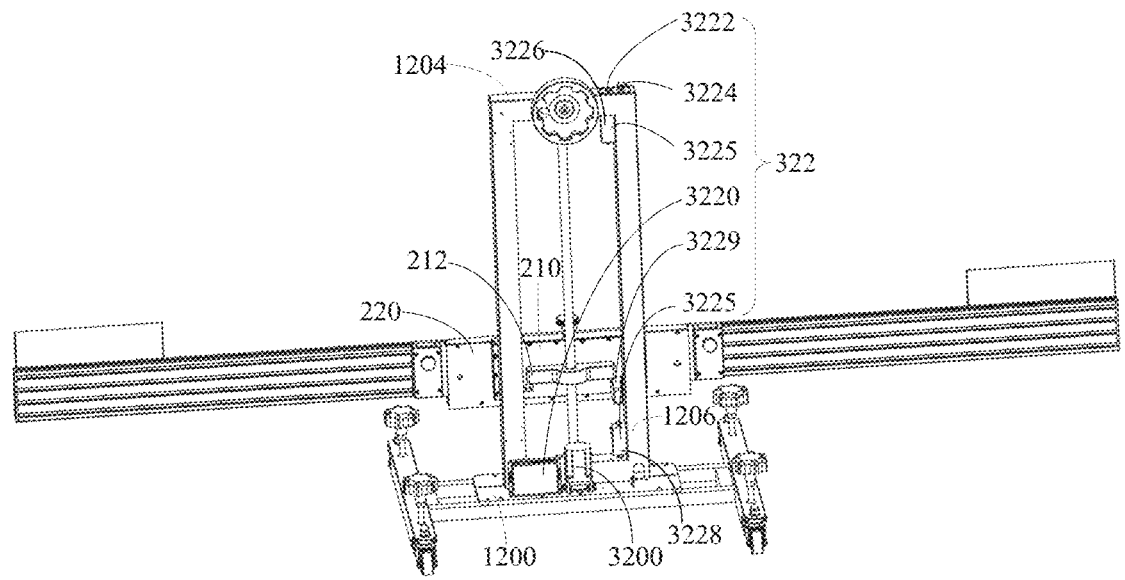
FIG. 9 is a schematic structural diagram of another angle of the automobile calibration device shown in FIG. 1, where a sliding assembly and a mounting assembly of the automobile calibration device are omitted.

Referring to FIG. 9, the control assembly 322 includes a controller 3220, an up key 3222, a down key 3224, a limit switch 3225 and a trigger apparatus 3229. The controller 3220 is electrically connected to the up key 3222, the down key 3224 and the limit switch 3225. The controller 3220 is configured to control the motor 3200. The up key 3222, the down key 3224 and the limit switch 3225 are all configured to control the controller 3220. The trigger apparatus 3229 is configured to trigger the limit switch 3225.

The trigger apparatus 3229 is a plate-shaped structure. The trigger apparatus 3229 is installed on the sliding member body 210 and the trigger apparatus 3229 and the slider 312 are located on a same side of the sliding member body 210. The limit switch 3225 is installed on the vertical beams 1206. The limit switch 3225 is located above or below the trigger apparatus 3229. The up key 3222 and the down key 3224 are both installed on the roof beam 1204. The controller 3220 is installed on an upper surface of the installation plate 1200. The up key 3222, the down key 3224 and the limit switch 3225 are all electrically connected to the controller 3220 by using a wire harness (not shown in the figure). The wire harness is disposed inside the wiring groove structure and is connected to the controller 3220 through the wiring port.

The controller 3220 includes a driver (not shown in the figure) and an elevating control plate (not shown in the figure). The elevating control plate is connected to the driver. The driver is connected to the motor 3200. The driver is configured to control the motor 3200, for example, control the start/stop, speed, steering of the motor 3200. The up key 3222, the down key 3224, an upper limit switch 3226 and a lower limit switch 3228 are all electrically connected to the elevating control plate. The up key 3222, the down key 3224, the upper limit switch 3226 and the lower limit switch 3228 are all configured to control the elevating control plate.

When the up key 3222 is triggered, the controller 3220 is configured to control the motor 3200 to rotate in the first rotational direction. When the down key 3222 is triggered, the controller 3220 is configured to control the motor 3200 to rotate in the second rotational direction. When the up key 3222 and the down key 3224 are simultaneously triggered, the controller 3220 is configured to control the motor 3200 to stop rotating. It should be noted that, because the up key 3222 and the down key 3224 need to be set together for easy operation, there is a possibility of misoperation. When the up key 3222 and the down key 3224 are simultaneously triggered, the controller 3220 is configured to control the motor 3200 to stop rotating, which can prevent the motor 3200 from being damaged by short circuit.

When the limit switch 3225 is triggered, the controller 3220 is configured to control the motor 3200 to stop rotating and control the motor 3200 to rotate only in a preset direction, so that the trigger apparatus 3229 is away from the limit switch 3225.

It can be understood that, there may be one or two limit switches 3225. In this embodiment, the limit switch 3225 includes an upper limit switch 3226 and a lower limit switch 3228. The upper limit switch 3226 and the lower limit switch 3228 are both installed on a same side of the vertical beam 1206. The upper limit switch 3226 is located above the trigger apparatus 3229 and the lower limit switch 3228 is located below the trigger apparatus 3228.

When the upper limit switch 3226 is triggered, the controller 3220 is configured to control the motor 3200 to stop rotating and control the motor 3200 to rotate only in the second rotational direction. When the lower limit switch 3228 is triggered, the controller 3220 is configured to control the motor 3200 to stop rotating and control the motor to rotate only in the first rotational direction. It should be noted that, by setting the upper limit switch 3226 and the lower limit switch 3228, the location adjusting apparatus 20 is automatically prevented from exceeding the maximum stroke without manual intervention, and the motor 3200 is set to rotate in a specified direction to prevent the motor 3200 from being damaged by short circuit caused by misoperation.

The controller 3220 is further configured to control the rate of the motor 3200 increasing from 0 linear or non-linear to a preset value at the moment when the motor 3200 starts to rotate.

The power supply assembly includes a DC base, a power switch and a power indicator. When the DC base is connected to a power adapter and the power switch is opened, the power indicator emits preset light, such as red light, and the controller 3220 and the motor 3200 may work.

Figure 10:
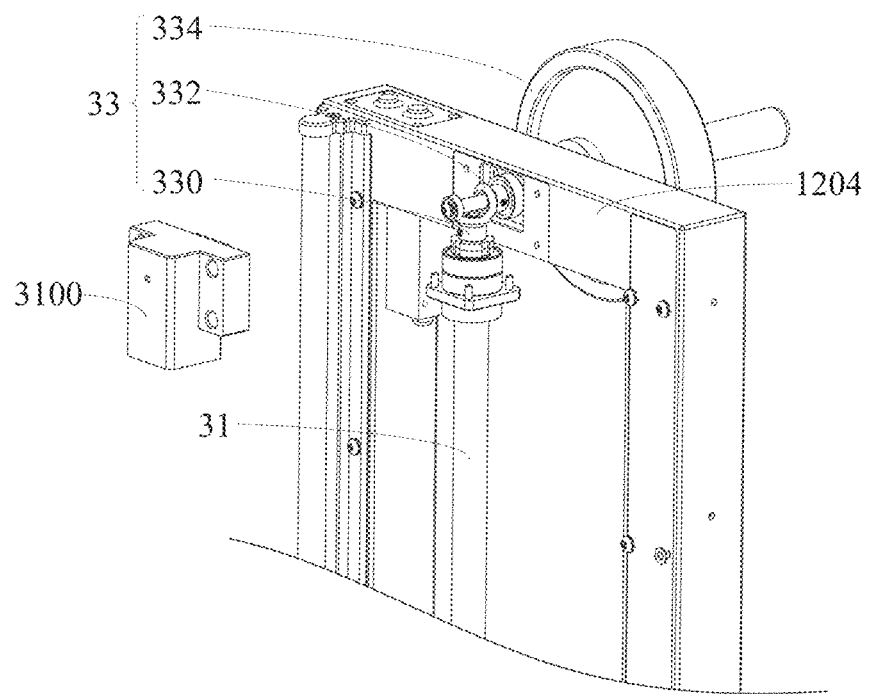
FIG. 10 is a schematic exploded view of a part of the automobile calibration device shown in FIG. 1, where a first shaft base is disassembled.

Referring to FIG. 10, the second driving mechanism 33 is a manual driving mechanism. The second driving mechanism 33 includes a first helical gear 330, a second helical gear 332 and an elevating hand wheel 334. A connecting rod (not shown in the figure) of the elevating hand wheel 334 passes through the roof beam 1204 and is received in the first shaft base 3100. The first helical gear 330 and the second helical gear 332 are both located in the first shaft base 3100.

The first helical gear 330 is fixedly installed on the elevating screw rod 31 and the first helical gear 330 and the elevating screw rod 31 are coaxially disposed. The second helical gear 332 is fixedly installed on the connecting rod of the elevating hand wheel 334 and the second helical gear 332 and the connecting rod of the elevating hand wheel 334 are coaxially disposed. The first helical gear 330 meshes with the second helical gear 332. A rotational axis of the elevating hand wheel 334 is horizontally disposed. It should be noted that, by setting the second driving mechanism 33, in one aspect, the automobile calibration device 100 may be used normally in a status of lacking of power supply. In another aspect, the first driving mechanism 32 and the second driving mechanism 33 share one transmission mechanism 31, resulting in a compact overall structure. It can be understood that, in some other embodiments, the angle between the rotational axis of the elevating hand wheel 334 and the horizontal plane may be set to any value according to an actual situation.

In this embodiment, the automobile calibration device 100 may implement automatic rising and falling of the location adjusting apparatus 20, the clamping apparatus 40, the sliding apparatus 50 and the scale apparatus 60 by setting the driving mechanism 30, to avoid manual adjustment.

In addition, the transmission mechanism 31 is set as the cooperation between the elevating screw rod 31 and the threaded through hole 2120. In the process of lifting the location adjusting apparatus 20, the location adjusting apparatus 20 may rise and fall gently and the position adjusting apparatus 20 is uneasy to slide.

Moreover, by setting the first driving mechanism 32 and the second driving mechanism 33 to be used in the status of lacking of power supply, the applicability of the automobile calibration device 100 is improved. At the same time, the first driving mechanism 32 and the second driving mechanism 33 share the same transmission mechanism 31, thereby improving the overall compactness of the automobile calibration device 100.

Finally, by dividing the gear teeth area 3208 and the non-gear teeth area 3209 on the assembly surface 3207, the rate of the second gear teeth 3204 is controlled to achieve the purpose of deceleration.

Figure 11:
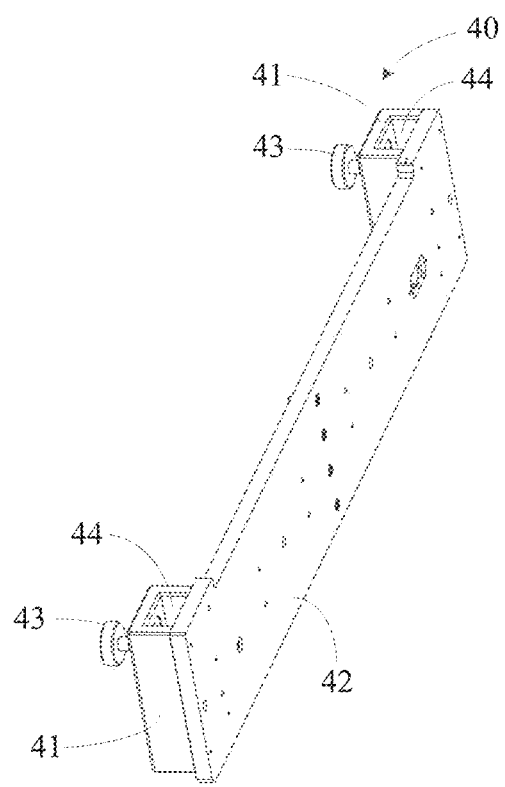
FIG. 11 is a schematic structural diagram of a clamping apparatus of the automobile calibration device shown in FIG. 1.
Figure 12:
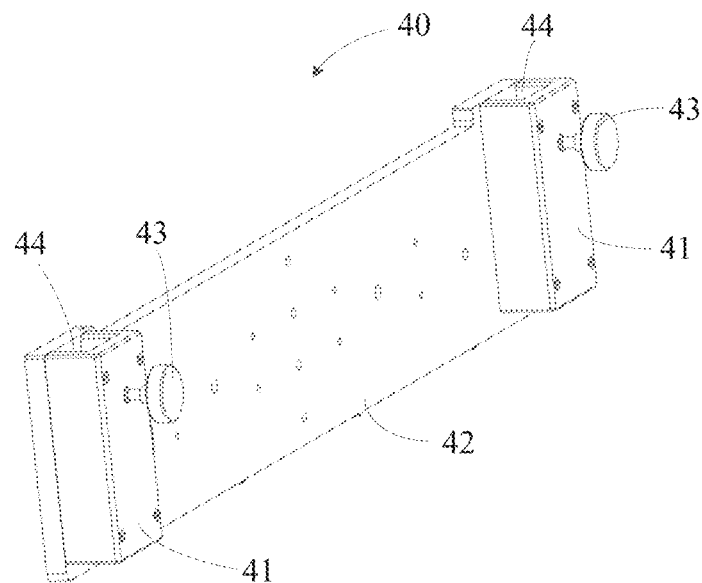
FIG. 12 is a schematic structural diagram of another angle of the clamping apparatus shown in FIG. 11.

Referring to FIG. 11 and FIG. 12 together, the clamping apparatus 40 includes a fixing block 41, a fixing plate 42 and a tension knob 43. The fixing block 41 is fixedly installed on the fixing plate 42. A receiving cavity 44 is enclosed by the fixing block 41 and the fixing plate 42. The receiving cavity 44 is configured to receive a fixing rod of a calibration apparatus. The tension knob 43 is installed on the fixing block 41. The tension knob 43 may rotate relative to the fixing block 41 to extend inside the receiving cavity 44 and to abut against the fixing rod of the calibration apparatus inserted in the receiving cavity 44.

Figure 13:
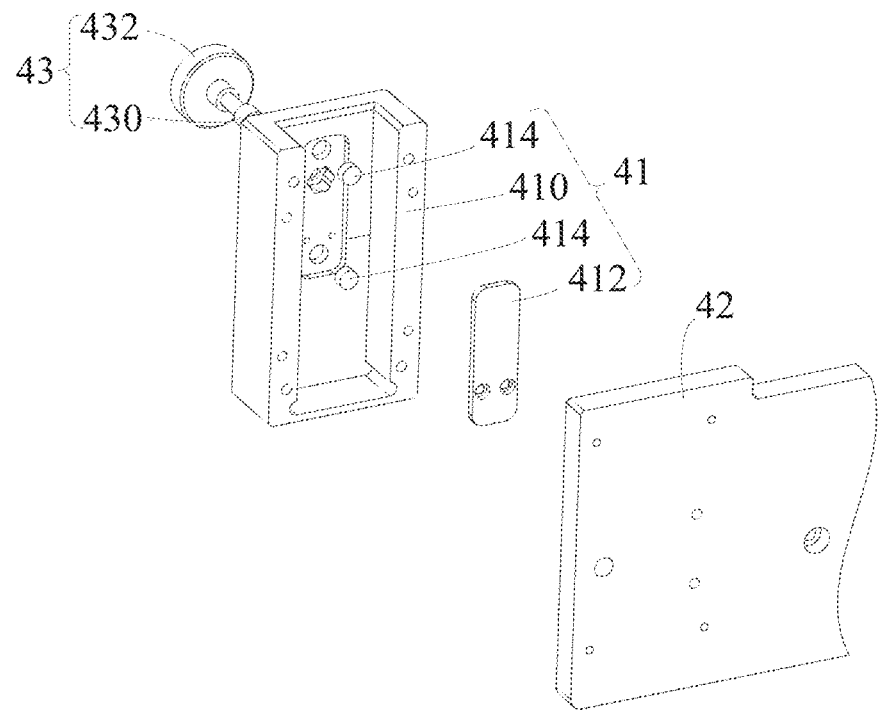
FIG. 13 is an exploded view of the clamping apparatus shown in FIG. 11.

Referring to FIG. 13, the fixing block 41 includes a fixing block body 410 and a locking spring piece 412 and a magnetic element 414. The fixing block body 410 is fixedly installed on the fixing plate 41 and the receiving cavity 44 is enclosed by the fixing block body 410 and the fixing plate 42. The locking spring piece 412 is located in the receiving cavity 44 and is configured to be pushed by the tension knob 43 to abut against the fixing rod of the calibration apparatus. The magnetic element 414 is fixedly installed on the fixing block body 410. The magnetic element 414 is located in the receiving cavity 44. The magnetic element 414 is configured to absorb the locking spring piece 412, so that the locking spring piece 412 is away from the fixing rod of the calibration apparatus. In this embodiment, there are two magnetic elements 414, which are arranged in a vertical direction. The two magnetic elements 414 are respectively located on two opposite ends of the locking spring piece 412, so that the locking spring piece 412 may be strongly and stably absorbed. It can be understood that, in some other embodiments, the quantity of the magnetic elements 414 may be changed according to an actual demand, provided that there is at least one magnetic element 414.

Figure 14:
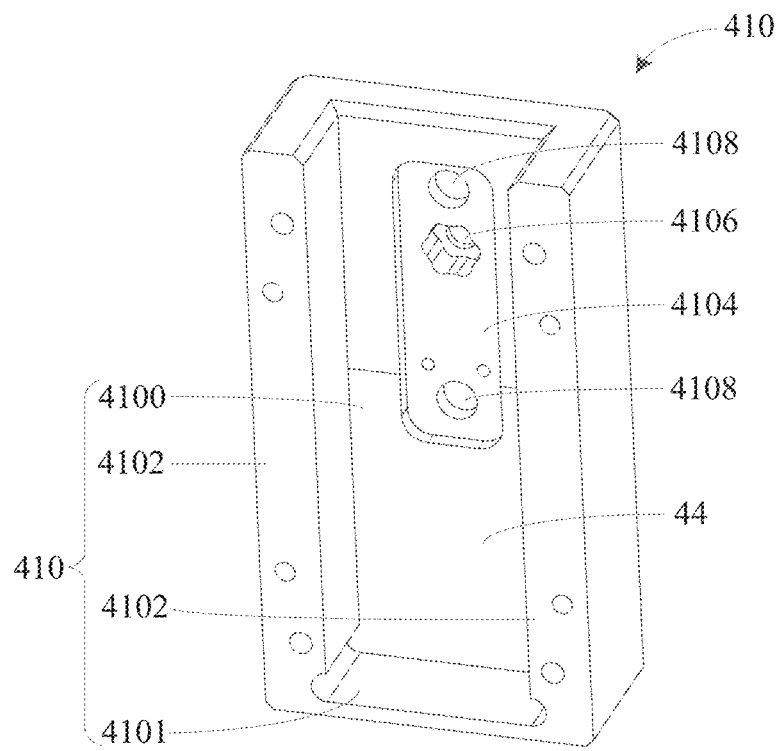
FIG. 14 is a schematic structural diagram of a main body of a fixed block of the clamping apparatus shown in FIG. 11.
Figure 15:
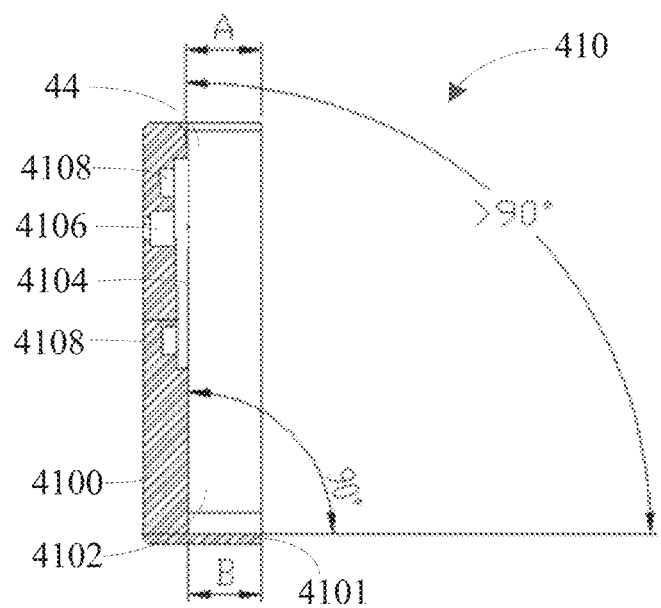
FIG. 15 is a cross-sectional view of the main body of the fixed block shown in FIG. 14.

Referring to FIG. 14 and FIG. 15 together, the fixing block body 410 includes a side wall 4100, a bottom wall 4101 and a connecting wall 4102. The bottom wall 4101 connects the side wall 4100 and the connecting wall 4102. There are two connecting walls 4102, which are connected to two opposite sides of the side wall 4100. Similarly, the two connecting walls 4102 are connected to two opposite sides of the bottom wall 4101. The two connecting walls 4102 and the bottom wall 4101 are fixedly installed on the fixing plate 42. The side wall 4100, the bottom wall 4101, the connecting wall 4102 and the fixing plate 42 jointly enclose the receiving cavity 44.

The side wall 4100 is provided with a groove 4104. The groove 4104 is configured to receive the locking spring piece 412. An inner wall of the groove 4104 is provided with a threaded fixing through hole 4106 and a receiving groove 4108. The fixing through hole 4106 is a threaded hole and is configured to mate with the tension knob 43. The receiving groove 4108 is a blind hole and there are two receiving grooves 4108, which are configured to receive the magnetic elements 414. The two receiving grooves 4108 are arranged in a vertical direction and are respectively located on two sides of the fixing through hole 4106.

One side of the side wall 4100 close to the bottom wall 4101 is perpendicularly connected to the bottom wall 4101, and the other side of the side wall 4100 away from the bottom wall 4101 inclines in a direction away from the receiving cavity 44, so that the other side of the side wall 4100 away from the bottom wall 4101 is at an obtuse angle to the bottom wall 4101. A width B of the other side of the connecting wall 4102 close to the bottom wall 4101 is less than a width A of one side of the connecting wall 4102 away from the bottom wall 4101. That is, a width of a bottom of the receiving cavity 44 is less than a width of a port of the receiving cavity 44, so that the fixing rod of the calibration apparatus can be easily inserted in the receiving cavity 44. When the fixing rod of the calibration apparatus is inserted in the bottom of the receiving cavity 44, the fixing rod of the calibration apparatus is firmly fixed in the receiving cavity 44.

Referring to FIG. 13 again, the fixing plate 42 is a rectangular plate, and may be made of stronger materials, such as a stainless steel material.

The tension knob 43 includes a pushing rod 430 and a knob portion 432. The pushing rod 430 has an external thread and passes through the fixing through hole 4106, so that one end of the pushing rod 430 extends in the receiving cavity 44. The pushing rod 430 mates with the fixing through hole 4106 by threads. The knob portion 432 is cylindrical, is fixedly installed on the other end of the pushing rod 430 and is configured to make it convenient for the user to grip and rotate the tension knob 43.

In this embodiment, there are two the fixing blocks 41 and two tension knobs 43. The two fixing blocks 41 are respectively fixedly installed on the fixing plate 42, are located on a same side of the fixing plate 42, and are arranged in a horizontal direction.

Figure 16:
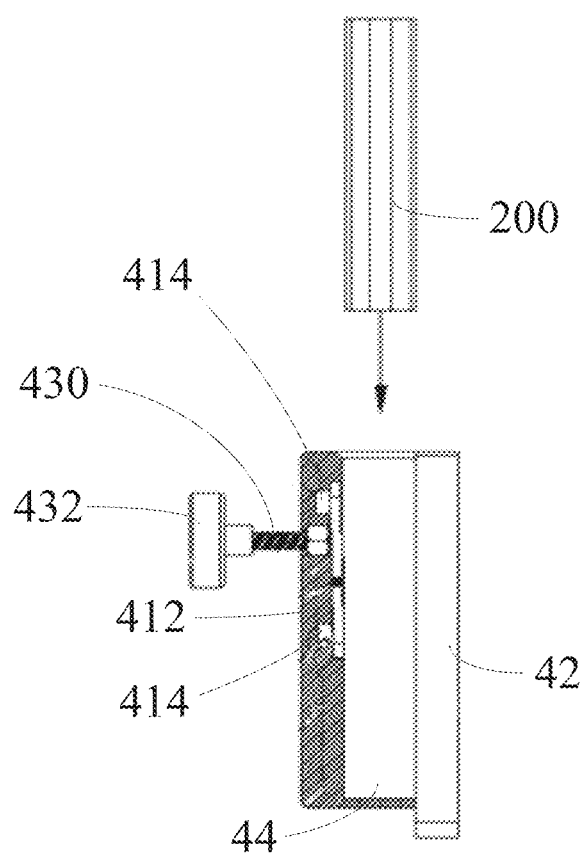
FIG. 16 is a use state diagram of the clamping apparatus shown in FIG. 11, where a fixed rod is located outside the clamping apparatus.

Referring to FIG. 16, when the knob portion 432 is rotated in a counterclockwise direction, the pushing rod 430 moves in a direction away from the locking spring piece 412 and the pushing rod 430 is not in contact with the locking spring piece 412. In this case, the magnetic element 414 absorbs the locking spring piece 412 in a direction away from the fixing plate 42, so that a size of the port of the receiving cavity 44 is increased, to facilitate insertion of the fixing rod 200.

Figure 17:
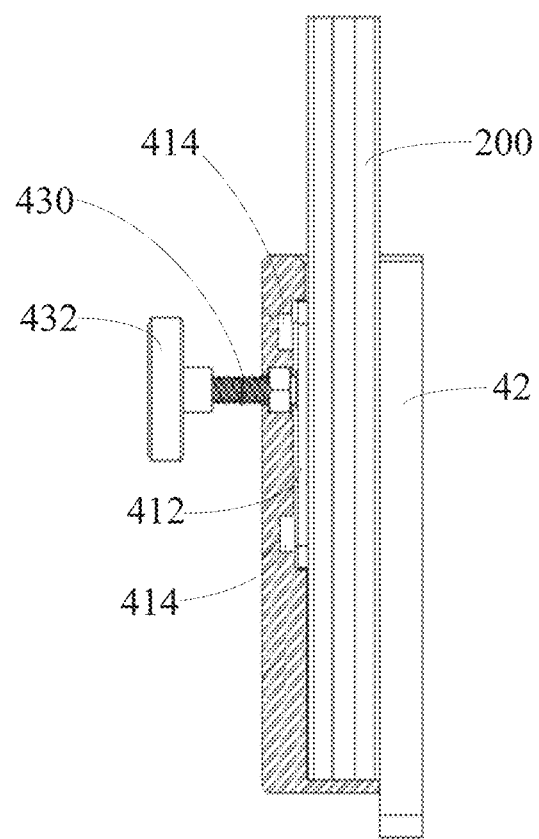
FIG. 17 is a use state diagram of the clamping apparatus shown in FIG. 11, where the fixed rod is inserted into the clamping apparatus.

Referring to FIG. 17, when the fixing rod 200 is inserted in the bottom of the receiving cavity 44, the knob portion 432 is rotated in a clockwise direction, and the pushing rod 430 is in contact with the locking spring piece 412 and pushes the locking spring piece 412 to abut against the fixing rod 200, so that the fixing rod 200 is clamped in the receiving cavity 44.

In this embodiment, the locking spring piece 412 is pushed to abut against a clamping-needed apparatus such as the fixing rod 200 by using the tension knob 43. Because the locking spring piece 412 is in surface contact with the clamping-needed apparatus, friction between the locking spring piece 412 and the clamping-needed apparatus is increased, so that the locking spring piece 412 can firmly abut against the clamping-needed apparatus. The assembly accuracy of the locking spring piece 412 and the clamping-needed apparatus is reduced, which is conducive to the quick assembly of the clamping-needed apparatus to the clamping apparatus 40. In addition, the locking spring piece 412 is absorbed in a direction away from the fixing plate 42 by using the magnetic element 414, so that the size of the port of the receiving cavity 44 can be increased to facilitate insertion of the clamping-needed apparatus.

Figure 18:
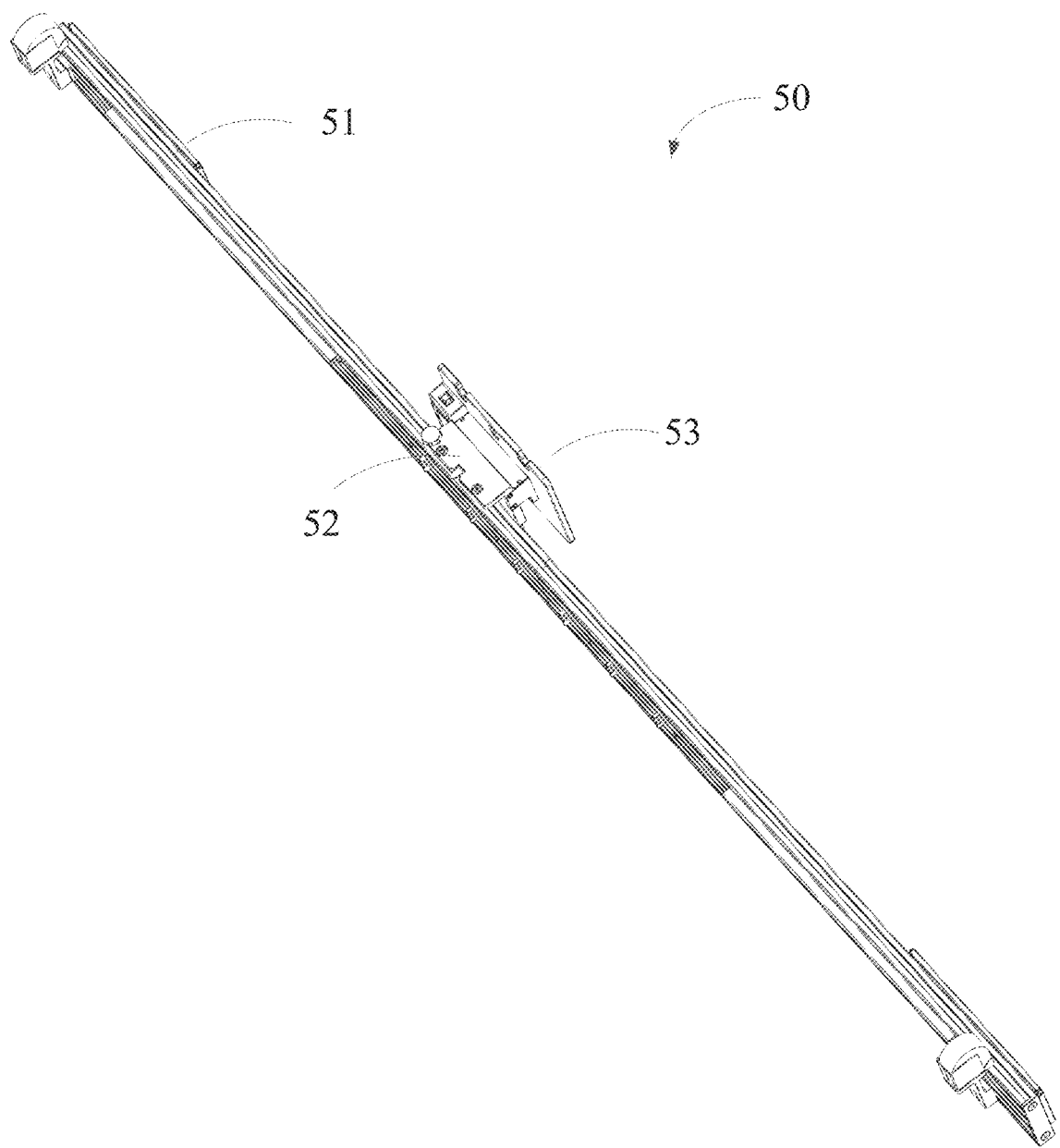
FIG. 18 is a schematic structural diagram of a sliding apparatus of the automobile calibration device shown in FIG. 1.
Figure 19:
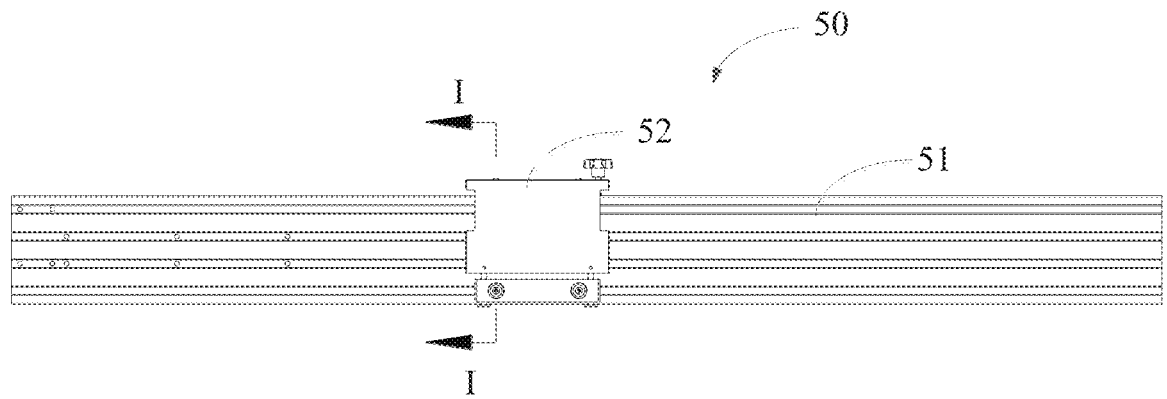
FIG. 19 is a front view of the sliding apparatus shown in FIG. 18, where a mounting assembly of the sliding apparatus is omitted.
Figure 20:
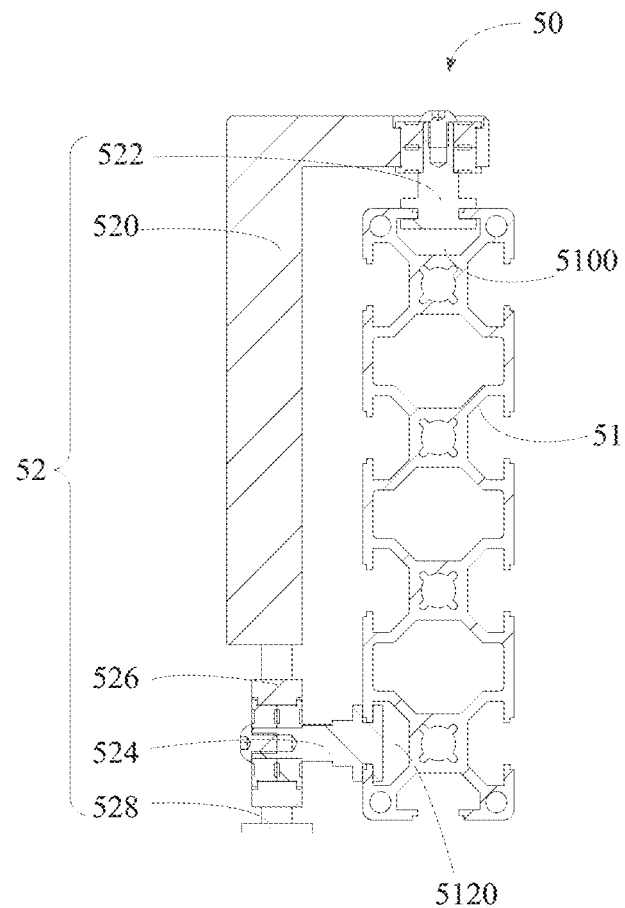
FIG. 20 is a cross-sectional view of the sliding apparatus shown in FIG. 18 in an I-I direction.

Referring to FIG. 18 to FIG. 20, the sliding apparatus 50 includes a guide rail 51, a sliding assembly 52 and a mounting assembly 53. The guide rail 51 may be fixedly installed on the fixing plate 42 in any suitable manner (for example, the guide rail 51 may be fixedly installed on the fixing plate 42 in a screw connecting manner) and is disposed in a horizontal direction. The sliding assembly may be movably installed on the guide rail 51 and is slidable along the guide rail 51 (alternatively, the sliding assembly 52 is movable in a horizontal direction relative to the guide rail 51). The mounting assembly 53 is fixedly installed on the sliding assembly 52 and may follow the sliding assembly 52 to slide along the guide rail 51.

Figure 21:
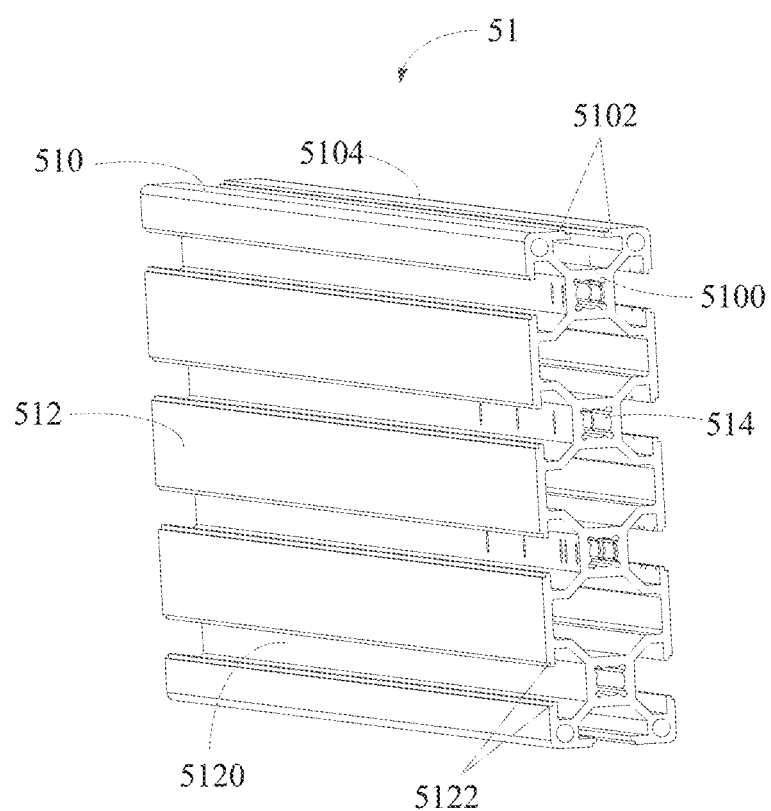
FIG. 21 is a schematic structural diagram of a guide rail of the sliding apparatus shown in FIG. 18.

Specifically, referring to FIG. 21, the guide rail 51 is roughly in a cuboid shape and includes a first surface 510 and a second surface 512 that are perpendicular to each other. The first surface 510 is perpendicular to the plane at which the fixing plate 42 is located. The second surface 512 is parallel to the plane at which the fixing plate 42 is located and faces away from the fixing plate 42. Particularly, in this embodiment, the interior of the guide rail 51 is further provided with a plurality of through holes 514 with a predetermined shape in a horizontal direction and is configured to disperse the stress borne by the interior of the guide rail 51. Also, in a case in which a rigid requirement of the guide rail 51 is met, the weight of the guide rail 51 is reduced. It can be understood that, in some other embodiments, the through holes 514 may also be omitted.

The first surface 510 is provided with a first sliding groove 5100 configured to install the sliding assembly 52. The first sliding groove 5100 extends in a horizontal direction. The cross section of the first sliding groove 5100 is roughly in a "trapezoid shape". A width of the bottom of the first sliding groove 5100 is less than a width close to the opening, to reduce a friction area between the sliding assembly 52 and the first sliding groove 5100, so that the sliding assembly 52 can slide along the first sliding groove 5100 more smoothly. Further, in this embodiment, the opening of the first sliding groove 5100 is in a "T shape" and is provided with first engagement portions 5102 extending to each other, to limit the sliding assembly 52, reduce the shaking of the sliding assembly 52 and avoid the derailment of the sliding assembly 52.

In addition, the first surface 510 is further provided with a horizontal graduated scale 5104 taking its center as the zero point and extending to two sides. That is, the scale of the horizontal graduated scale 5104 takes the center of the guide rail 51 as the zero point and gradually increases to two sides of the guide rail 51, to facilitate the position locating of the sliding assembly 52. It can be understood that, in some other embodiments, the horizontal graduated scale may also be disposed on the second surface 512, or the horizontal graduated scale 5104 is omitted, The second surface 512 is provided with a second sliding groove 5120 configured to install the sliding assembly 52. The second sliding groove 5120 is parallel to the first sliding groove 5100. That is, the second sliding groove 5120 also extends in a horizontal direction, so that the sliding assembly 52 is slidable along both the first sliding groove 5100 and the second sliding groove 5120 and further moves in a horizontal direction relative to the guide rail 51. Similarly, in this embodiment, the cross section of the second sliding groove 5120 is also roughly in a "trapezoid shape". A width of the bottom of the second sliding groove 5120 is less than a width close to the opening, to reduce a friction area between the sliding assembly 52 and the second sliding groove 5120, so that the sliding assembly 52 can slide along the second sliding groove 5120 more smoothly. Further, in this embodiment, the opening of the second sliding groove 5120 is also in a "T shape" and is provided with second engagement portions 5122 extending to each other, to limit the sliding assembly 52, reduce the shaking of the sliding assembly 52 and avoid the derailment of the sliding assembly 52.

In this embodiment, a width of the second surface 512 is greater than a width of the first surface 510. Four second sliding grooves 5120 are included. The four second sliding grooves 5120 are parallel to the second surface 512 at intervals. Each second sliding groove 5120 may be configured to install the sliding assembly 52. It can be understood that, in some other embodiments, there may be more or fewer second sliding grooves 5120 according to an actual demand. For example, the quantity of the second sliding grooves 5120 is reduced to one, two or five, or increased to five. This is not specifically limited in the embodiments of the present invention. In the same way, in some other embodiments, a plurality of first sliding grooves 5100 may also be disposed on the first surface 510.

It can be understood that, in this embodiment, the cross sections of the first sliding groove 5100 and the second sliding groove 5120 are roughly in a "trapezoid shape". Openings of the first sliding groove 5100 and the second sliding groove 5120 are respectively provided with the first engagement portion 5102 and the second engagement portion 5122, so as to enable the sliding assembly 52 to slide more smoothly and to avoid the derailment of the sliding assembly 52. In some other embodiments, the first sliding groove 5100 and the second sliding groove 5120 may also be set as other suitable structures, such as a strip-shaped groove, or a T-shaped groove.

Figure 22:
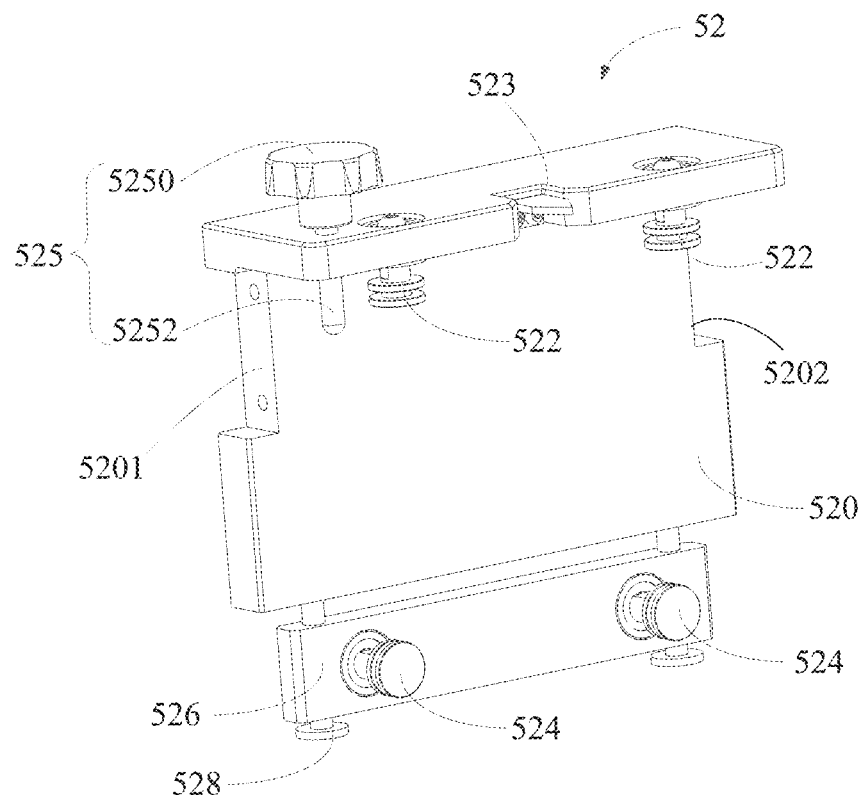
FIG. 22 is a schematic structural diagram of a sliding assembly of the sliding apparatus shown in FIG. 18.

Specifically, referring to FIG. 22, the sliding assembly 52 includes a plate body 520, a first sliding member 522 and a second sliding member 524. One end of the first sliding member 522 and one end of the second sliding member 524 are respectively installed on the plate body 520. The other end of the first sliding member 522 is movably installed in the first sliding groove 5100 and the first sliding member 522 is slidable along the first sliding groove 5100. The other end of the second sliding member 524 is movably installed in the second sliding groove 5120 and the second sliding member 524 is slidable along the second sliding groove 5120. Therefore, the plate body 520 is slidable along the guide rail 51.

The sliding assembly 52 further includes an installation plate 526 and a guiding shaft 528. One end of the second sliding member 524 is fixedly installed on the installation plate 526. The installation plate 526 is installed on the plate body 520 by using the guiding shaft 528 and is movable along the guiding shaft 528 relative to the plate body 520 (alternatively, the installation plate 526 can be close to or away from the plate body 520 along the guiding shaft 528). Therefore, when the sliding assembly 52 is installed on the guide rail 51 (that is, the first sliding member 522 is installed in the first sliding groove 5100 and the second sliding member 524 is installed in the second sliding groove 5120), a distance between the installation plate 526 and the plate body 520 is adjusted by adjusting the guiding shaft 528, so that an assembly error between the sliding assembly 52 and the guide rail 51 may be adjusted, which enables the sliding assembly 52 to slide on the guide rail 51 more smoothly. Certainly, in actual application, the first sliding member 522 may also be installed on the plate body 520 by using another pair of installation plate 526 and guiding shaft 528. Alternatively, the first sliding member 522 and the second sliding member 524 are both directly fixedly installed on the plate body 520.

The plate body 520 is configured to install the mounting assembly 53 and drive the mounting assembly 53 to slide along the guide rail 51. Specifically, in this embodiment, the plate body 520 is roughly in an "L shape". The first sliding member 522 is installed on one end of the plate body 520. The second sliding member 524 is installed on the other end of the plate body 520. In the plate body 520, an inner surface of one end where the first sliding member 522 is installed faces the first surface 510. An inner surface of one end where the second sliding member 524 is installed faces the second surface 512. Therefore, the first sliding member 522 can be movably installed in the first sliding groove 5100 and the second sliding member 524 can be movably installed in the second sliding groove 5120. It can be understood that, in this embodiment, the plate body 520 adopting the "L shape" can reduce components of the sliding assembly 52 and reduce costs. In some other embodiments, the shape of the plate body 520 may also not be limited to the "L shape". For example, the plate body 520 may also be in a flat plate shape. The first sliding member 522 is installed on the plate body 520 by using other components.

One side of the plate body on which the first sliding member 522 is installed is provided with a scale pointer 523. After the sliding assembly 52 is installed on the guide rail 51, the scale pointer 523 is located right above the horizontal graduated scale 5104, so as to calibrate the location of the plate body 520. Optionally, the scale pointer 523 is disposed on a central line of the plate body 520 in a horizontal direction. Certainly, it can be understood that, in some other embodiments, if the horizontal graduated scale 5104 is disposed on the second surface 512, the scale pointer 523 is correspondingly disposed on one side of the plate body 520 where the second sliding member 524 is installed.

Two opposite sides of the plate body 520 are respectively provided with a first installation groove 5201 and a second installation groove 5202 that are configured to install the mounting assembly 53. The first installation groove 5201 and the second installation groove 5202 are aligned in a sliding direction of the plate body 520. In this embodiment, the first installation groove 5201 and the second installation groove 5202 are disposed to improve a bearing capacity of the plate body 520 in a vertical direction, so that the mounting assembly 53 can be fixedly installed on the plate body 520 more firmly. It can be understood that, in some other embodiments, the first installation groove 5201 and the second installation groove 5202 may also be omitted.

Moreover, the sliding assembly 52 further includes a locking member 525 configured to abut against the guide rail 51, so that the plate body 520 is fixed on the guide rail 51. In this embodiment, the side of the plate body 520 on which the first sliding member 522 is installed is further provided with a threaded hole (not shown in the figure) configured to install the locking member 525. Specifically, the locking member 525 may include a knob 5250 and a threaded rod 5252. The knob 5250 is fixed on one end of the threaded rod 5252 and the other end of the threaded rod 5252 may pass through the threaded hole and abut against or be away from the guide rail 51. Specifically, when a user tightens the knob 5250 to make the other end of the threaded rod 5252 abut against the guide rail 51, the plate body 520 may be fixed on the guide rail 51. When the user loosens the knob 5250 to make the other end of the threaded rod 5252 be away from the guide rail 51, the plate body 520 may slide relative to the guide rail 51, which is convenient to readjust the location of the plate body 520. Similarly, it can be understood that, in some other embodiments, the locking member 525 may also be installed on other suitable locations of the plate body 520. For example, the locking member 525 is installed on one side of the plate body 520 where the second sliding member 524 is installed. Moreover, the specific structure of the locking member 525 may also not be limited to the structures described above, provided that the plate body 520 can be fixed or move relative to the guide rail 51.

Two first sliding members 522 are included. The two first sliding members 522 are horizontally disposed along the first sliding groove 5100.

Figure 23:
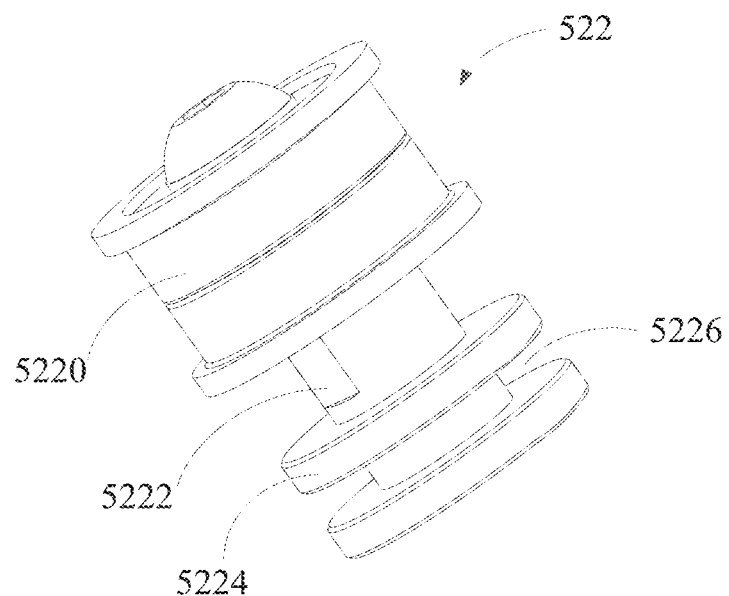
FIG. 23 is a schematic structural diagram of a first sliding member of the sliding assembly shown in FIG. 22.

Specifically, referring to FIG. 23, the first sliding member 522 includes a first bearing 5220, a first pin shaft 5222 and a first roller 5224. The first bearing 5220 is sleeved on one end of the first pin shaft 5222 and the first roller 5224 is disposed on the other end of the first pin shaft 5222. The first bearing 5220 is fixedly installed on the plate body 520. The first roller 5224 is movably installed in the first sliding groove 5100 and may roll along the first sliding groove 5100. In actual application, the first pin shaft 5222 may rotate relative to the first bearing 5220 and/or the first roller 5224 may rotate relative to the first pin shaft 5222. This is not specifically limited in the embodiments of the present invention.

The first roller 5224 is in an "H shape" and is provided with a first annular groove 5226. As shown in FIG. 20, after the first sliding member 522 is installed in the first sliding groove 5100, the first engagement portion 5102 of the first sliding groove 5100 is engaged with the first annular groove 5226. The first roller 5224 may roll along the first engagement portion 5102.

Two second sliding members 524 are also included. The two second sliding members 524 are horizontally disposed along the second sliding groove 5120. Particularly, in this embodiment, the two second sliding members 524 are disposed on one end away from the first surface 510 (that is, the two second sliding members 524 are disposed on the second sliding groove 5120 away from the first surface 510), to balance the stress of the plate body 520 and improve the load capacity of the plate body 520. In some other embodiments, the second sliding member 524 may also be disposed on other second sliding grooves 5120, provided that the second sliding member 524 is slidable in a horizontal direction relative to the guide rail 51.

Figure 24:
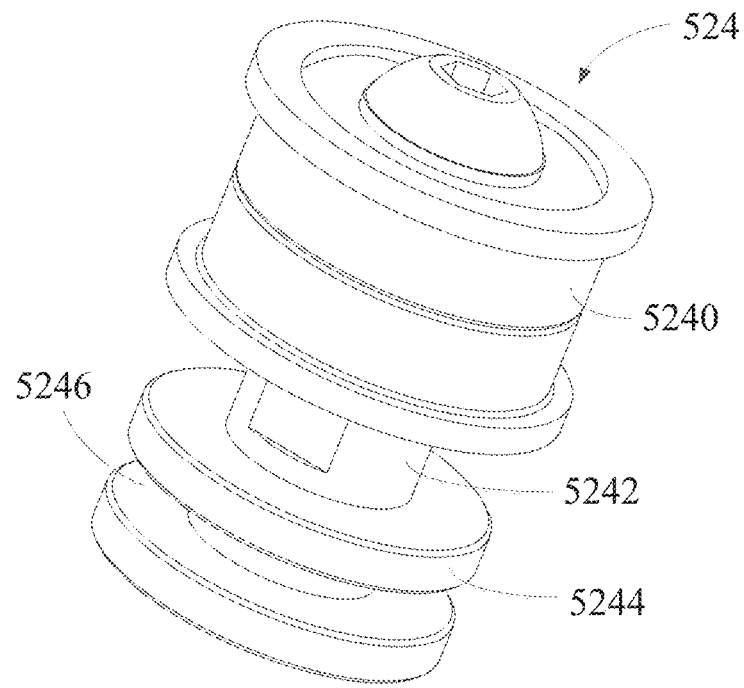
FIG. 24 is a schematic structural diagram of a second sliding member of the sliding assembly shown in FIG. 22.

Specifically, referring to FIG. 24, the structure of the second sliding member 524 is the same as the structure of the first sliding member 522. The second sliding member 524 includes a second bearing 5240, a second pin shaft 5242 and a second roller 5244. The second bearing 5240 is sleeved on one end of the second pin shaft 5242 and the second roller 5244 is disposed on the other end of the second pin shaft 5242. The second bearing 5240 is fixedly installed on the installation plate 526. The second roller 5244 is movably installed in the second sliding groove 5120 and may roll along the second sliding groove 5120. Similarly, in actual application, the second pin shaft 5242 may rotate relative to the second bearing 5240 and/or the second roller 5244 may rotate relative to the second pin shaft 5242. This is not specifically limited in the embodiments of the present invention.

The second roller 5244 is in an "H shape" and is provided with a second annular groove 5246. As shown in FIG. 20, after the second sliding member 524 is installed in the second sliding groove 5120, the second engagement portion 5122 of the second sliding groove 5120 is engaged with the second annular groove 5246. The second roller 5244 may roll along the second engagement portion 5122.

It can be understood that, in this embodiment, two first sliding members 522 are included. The two first sliding members 522 are horizontally disposed along the first sliding groove 5100. Two second sliding members 524 are also included. The two second sliding members 524 are horizontally disposed along the second sliding groove 5120, so as to improve the load capacity of the plate body 520 and to enable the plate body 520 to slide more smoothly on the guide rail 51. Therefore, the reliability of the sliding assembly 52 is improved. In some other embodiments, the quantities of the first sliding members 522 and the second sliding members 524 may be set according to an actual demand. For example, one first sliding member 522 and two second sliding members 524 may be included. The first sliding member 522 is disposed on a central line between the two second sliding members 524, so as to form a stable triangle structure. Alternatively, only one first sliding member 522 and one second sliding member 524 are included. In some other embodiments, to further inhibit the plate body 520 from overturning in a horizontal direction, a third sliding member may further be disposed on the other side surface (that is, a surface relative to the first surface 510) perpendicular to the second surface 512.

It can be understood that, in this embodiment, the first sliding member 522 and the second sliding member 524 both adopt a combination structure of a bearing, a pin shaft and a roller, so as to reduce the friction between the sliding assembly 52 and the guide rail 51 in a rolling manner, so that the sliding assembly 52 can move more smoothly relative to the guide rail 51. Moreover, the first roller 5224 and the second roller 5244 are both in an "H" shape. The first roller 5224 is provided with the first annular groove 5226. The second roller 5244 is provided with the second annular groove 5246. Therefore, the first roller 5224 and the second roller 5244 can respectively match with the first engagement portion 5102 in the first sliding groove 5100 and the second engagement portion 5122 in the second sliding groove 5120, which reduces the friction between the roller and the sliding groove, and limits the roller to avoid its derailment. In some other embodiments, the first sliding member 522 and/or the second sliding member 524 may also adopt other structures, provided that the first sliding member 522 and/or the second sliding member 524 are slidable along the guide rail 51. For example, the first sliding member 522 may be a first sliding block, the first sliding block being received in the first sliding groove 5100, and being slidable along the first sliding groove 5100; and/or the second sliding member 524 may be a second sliding block, the second sliding block being received in the second sliding groove 5120 and being slidable along the second sliding groove 5120.

Figure 25:
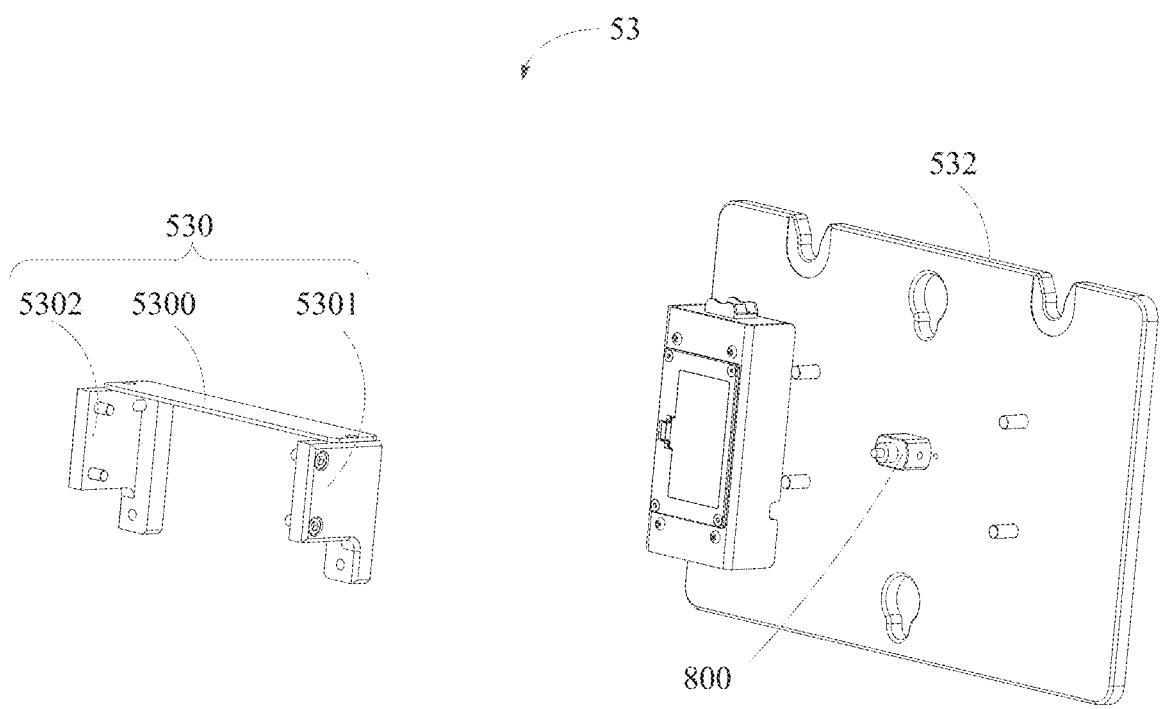
FIG. 25 is an exploded view of a mounting assembly of the sliding apparatus shown in FIG. 18.
Figure 26:
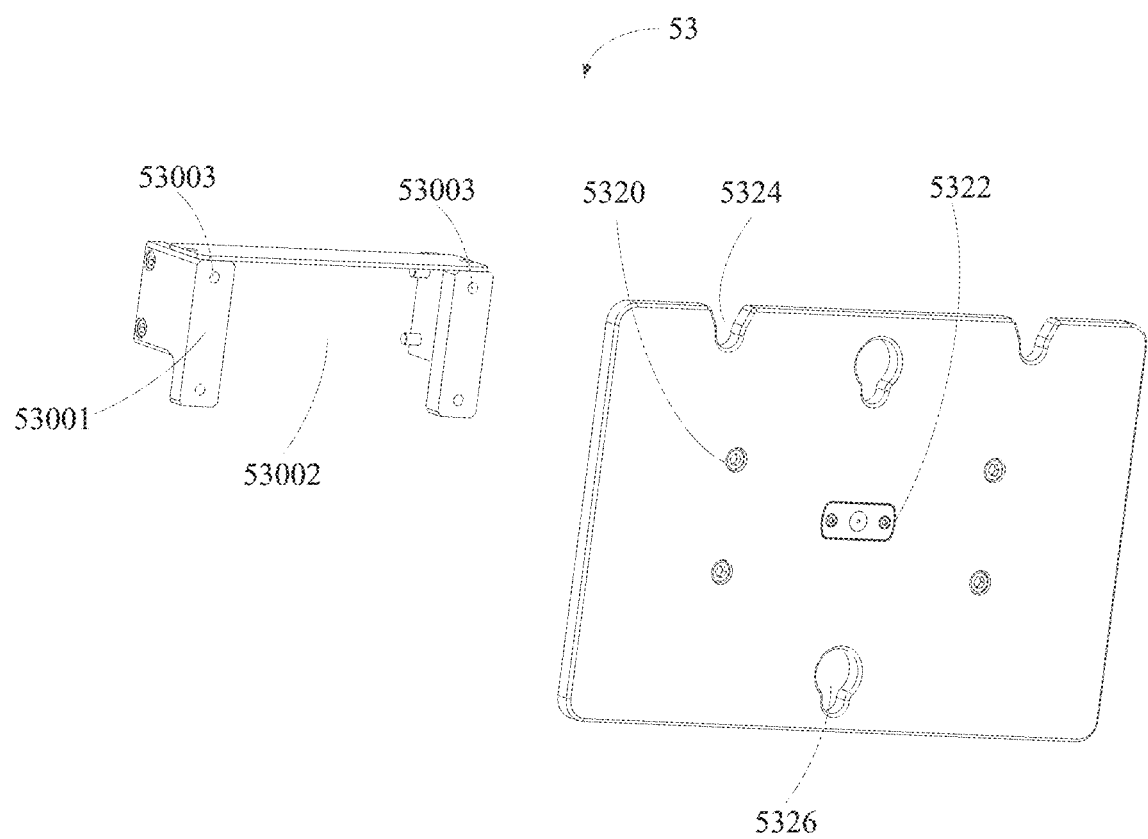
FIG. 26 is an exploded view of another angle of the mounting assembly shown in FIG. 25.

Referring to FIG. 18, FIG. 25 and FIG. 26 together, the mounting assembly 53 includes an installation member 530 and a mounting member 532. The mounting member 532 is fixedly installed on the plate body 520 by using the installation member 530.

Specifically, the installation member 530 includes a base portion 5300, a first extension portion 5301 and a second extension portion 5302. The first extension portion 5301 and the second extension portion 5302 respectively extend from two opposite sides of the base portion 5300. One end of the first extension portion 5301 away from the base portion 5300 is inserted in the first installation groove 5201 and is fixedly connected to the plate body 520. One end of the second extension portion 5302 away from the base portion 5300 is inserted in the second installation groove 5202 and is fixedly connected to the plate body 520.

The base portion 5300 has an installation surface 53001. The installation surface 53001 is provided with an accommodating groove 53002 and a plurality of installation holes 53003. The plurality of installation holes 53003 is disposed around the accommodating groove 53002.

The mounting member 532 is provided with a plurality of connection through holes 5320 corresponding to the installation holes 53003, which are configured to fixedly install the mounting member 532 on the installation member 530. After the mounting member 532 is installed on the installation surface 53001, the accommodating groove 53002 may be enclosed to form a receiving space.

The middle of the mounting member 532 is provided with a laser installation hole 5322 configured to install a calibration laser 800. After the calibration laser 800 is installed on the mounting member 532, a part of the calibration laser 800 is accommodated in the receiving space.

The mounting member 532 is in a rectangular plate shape. One side of the mounting member 532 is provided with a notch 5324 configured to mount a calibration assistance device (for example, a radar calibration plate or a reflection mirror). The mounting member 532 is further provided with a mounting hole 5326 configured to mount another calibration assistance device (for example, a night vision device or a blind spot tester). The installation complexity of the calibration assistance device and the bracket apparatus 10 can be simplified in the mounting manner, so as to improve user experience.

In some embodiments, the mounting assembly 53 may also be omitted. The calibration laser 800 and/or the calibration assistance device may be installed on the plate body 520 in other manners.

Figure 27:
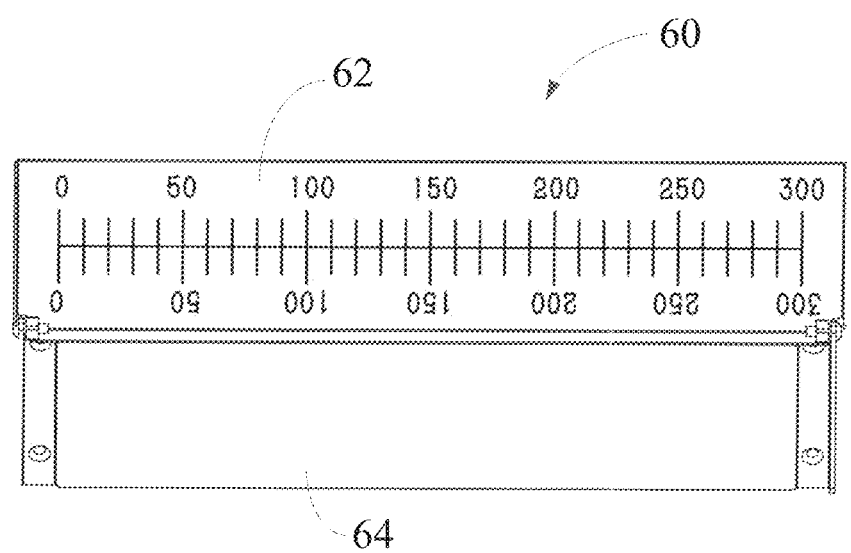
FIG. 27 is a schematic structural diagram of a scale apparatus of the automobile calibration device shown in FIG. 1.

Referring to FIG. 3 and FIG. 27 together, there are two scale apparatuses 60. The two scale apparatuses 60 are respectively installed on two opposite ends of the guide rail 51 and are symmetrically disposed relative to a central line 01 of the guide rail 51. Each scale apparatus 60 includes a scale plate 62 and a reflection mirror 64. The scale plate 62 is connected to the reflection mirror 64 and is located right above the reflection mirror 64. The reflection mirror 64 is configured to reflect a laser beam. The scale plate 62 is configured to determine the location at which the laser beam is projected on the reflection mirror 64.

Figure 28:
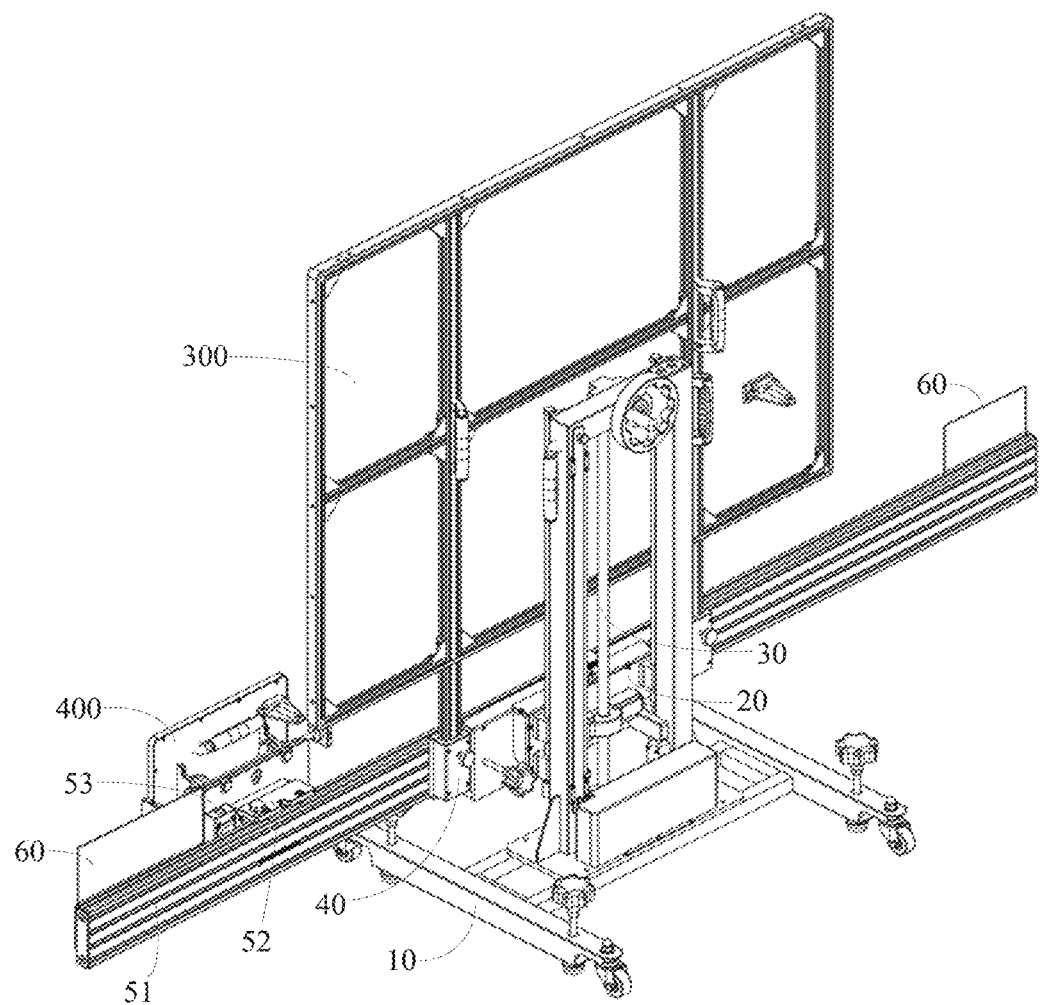
FIG. 28 is a use state diagram of the automobile calibration device shown in FIG. 1.

Referring to FIG. 28, when used, a fixing rod of a pattern plate 300 may be inserted in the clamping apparatus 40. A radar calibration plate 400 may be mounted on the mounting member 532. A horizontal position of the clamping apparatus 40 may be precisely adjusted by using the location adjusting apparatus 20, so that the pattern plate 300 may be moved to a needed location. The radar calibration plate 400 may be moved to a needed location by sliding the sliding assembly 52 along the guide rail 51.

Figure 29:
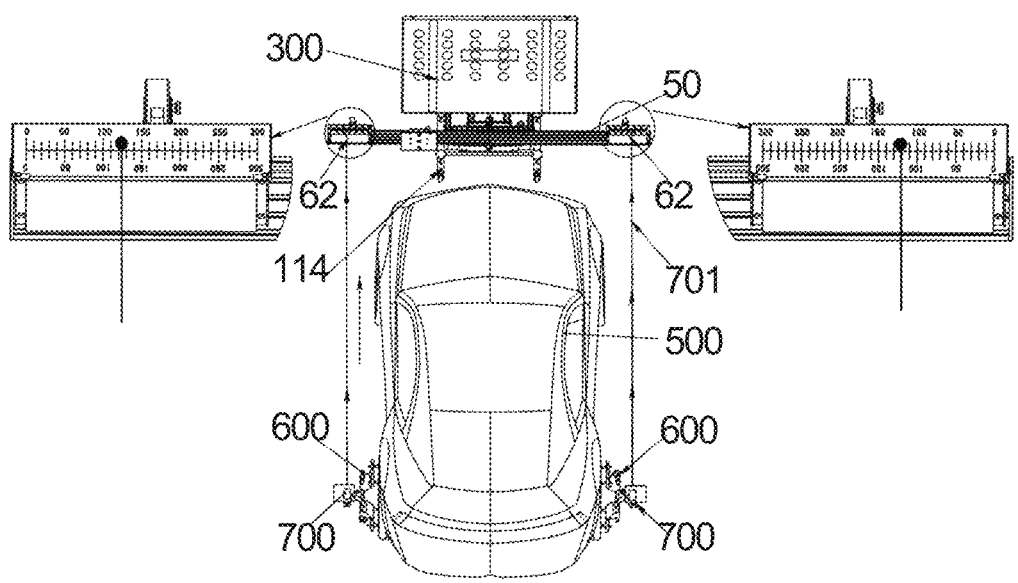
FIG. 29 is a schematic diagram showing that an automobile calibration device calibrates a to-be-calibrated automobile according to an embodiment of the present invention.

Referring to FIG. 29 together, when the automobile calibration device 100 is used to calibrate a central line of a to-be-calibrated automobile 500, it is specifically that:

Before the calibration, the automobile calibration device 100 is moved to the front of the to-be-calibrated automobile 500, and four height adjusting members 114 are screwed off, so that the roller 112 is separated from the ground. Therefore, the bracket apparatus 10 can be firmly fixed in the front of the to-be-calibrated automobile 500.

One wheel hub clamp 600 is installed on each rear wheel of the to-be-calibrated automobile 500. Each wheel hub clamp 600 is provided with a point laser 700. Each point laser 700 is configured to emit a point laser beam 701 to the corresponding scale plate 62. Each scale plate 62 and the corresponding point laser 700 are roughly located on a same horizontal plane by triggering the up key 3222 and the down key 3224.

The two scale plates 62 are adjusted according to a width of the to-be-calibrated automobile 500. Each point laser 700 is turned on to enable the point laser 700 to emit the point laser beam 701 to the corresponding scale plate 62. By observing the specific location at which the point laser beam 701 is emitted on the scale plate 62 and adjusting the adjusting member 24, the scale plate 62 is horizontally moved until readings on the scale plate 62 on which the point laser beam 701 is emitted are the same. In this case, the central line of the to-be-calibrated automobile 500 and a central line of the guide rail 51 are aligned. A camera of the to-be-calibrated automobile 500 may be calibrated by using the pattern plate 300.

Finally, it should be noted that, the foregoing embodiments are merely used for illustrating rather than limiting the technical solutions of the present invention. According to the idea of the present invention, technical features in the foregoing embodiments or in different embodiments may also be combined. Steps may be implemented in any order and there exist many other changes on different aspects of the present invention described above. For brevity, the changes are not provided in details. Although the present invention is described in detail according to the foregoing embodiments, a person of ordinary skill in the art should understand that modifications may be made to the technical solutions recorded in the foregoing embodiments or equivalent replacements may be made to some of the technical features therein. These modifications or replacements do not cause the essence of the corresponding technical solutions to depart from the scope of the technical solutions of the embodiments of the present invention.

What is claimed is:

1. An automobile calibration device, comprising:
    a bracket apparatus;
    a clamping apparatus, wherein the fixing plate is installed on the bracket apparatus, wherein
    the clamping apparatus comprises:
    the fixing plate;
    a fixing block, wherein the fixing block comprises a fixing block body and a locking spring piece, the fixing block body being installed on the fixing plate, a receiving cavity being enclosed by the fixing block body and the fixing plate and the locking spring piece being located in the receiving cavity, and
    a tension knob, wherein the tension knob is installed on the fixing block body, the tension knob being capable of rotating relative to the fixing block body, to extend inside the receiving cavity and to abut against the locking spring piece.

2. The automobile calibration device according to claim 1, wherein the clamping apparatus comprises a magnetic element, the magnetic element being installed on the fixing block body, the magnetic element being located in the receiving cavity and the magnetic element being configured to absorb the locking spring piece.

3. The automobile calibration device according to claim 2, wherein the fixing block body comprises a side wall, a bottom wall and a connecting wall, wherein
    the bottom wall connects the side wall and the connecting wall;
    two connecting walls are respectively connected to two opposite sides of the side wall, the two connecting walls being further respectively connected to two opposite sides of the bottom wall;
    the two connecting walls and the bottom wall are installed on the fixing plate; and
    the side wall, the bottom wall, the connecting wall and the fixing plate jointly enclose the receiving cavity.

4. The automobile calibration device according to claim 3, wherein the side wall is provided with a groove, the groove being configured to receive the locking spring piece.

5. The automobile calibration device according to claim 4, wherein an inner wall of the groove is provided with a fixing through hole and a receiving groove, wherein
    the fixing through hole is a threaded hole, the tension knob passing through the fixing through hole and the tension knob mating with the fixing through hole by threads; and
    the receiving groove receives the magnetic element.

6. The automobile calibration device according to claim 5, wherein there are two receiving grooves, the two receiving grooves being arranged in a vertical direction and the two receiving grooves being respectively located on two sides of the fixing through hole; and
    there are two magnetic elements, each magnetic element being received in a corresponding receiving groove.

7. The automobile calibration device according to claim 3, wherein one side of the side wall close to the bottom wall is perpendicularly connected to the bottom wall, the other side of the side wall away from the bottom wall inclining in a direction away from the fixing plate, so that a width (B) of one side of the connecting wall close to the bottom wall (4101) is less than a width (A) of the other side of the connecting wall away from the bottom wall (4101).

8. The automobile calibration device according to claim 1, wherein a width of a bottom of the receiving cavity is less than a width of a port of the receiving cavity.

9. The automobile calibration device according to claim 1, further comprising:
    a location adjusting apparatus, wherein the location adjusting apparatus is installed on the bracket apparatus, and is movable in a vertical direction relative to the bracket apparatus; and
    the fixing plate is installed on the bracket apparatus by using the location adjusting apparatus.

10. The automobile calibration device according to claim 9, further comprising:
- a driving assembly, configured to drive the location adjusting apparatus to move in a vertical direction relative to the bracket apparatus.

11. The automobile calibration device according to claim 9, wherein the location adjusting apparatus comprises:
- a sliding member, wherein the sliding member is installed on the bracket apparatus, and is movable in a vertical direction relative to the bracket apparatus;
- a supporting member, wherein the supporting member is movably installed on the sliding member, the fixing plate being installed on the supporting member and one of the sliding member and the supporting member comprising a rack gear; and
- an adjusting member, wherein the adjusting member comprises a gear, the gear meshing with the rack gear and when rotating, the gear being capable of driving the rack gear to move horizontally, so that the supporting member moves horizontally relative to the sliding member, to drive the clamping apparatus to move horizontally relative to the sliding member.

12. The automobile calibration device according to claim 11, wherein the location adjusting apparatus comprises a connecting assembly, the supporting member being installed on the sliding member by using the connecting assembly.

13. The automobile calibration device according to claim 12, wherein the connecting assembly comprises a linear slide rail and a slide rail fixing block, one of the linear slide rail and the slide rail fixing block being installed on the sliding member and the other one of the linear slide rail and the slide rail fixing block being installed on the supporting member, wherein
- the linear slide rail is disposed in a horizontal direction; and
- the slide rail fixing block is sleeved on the linear slide rail, the linear slide rail being slidable in a horizontal direction relative to the slide rail fixing block.

14. The automobile calibration device according to claim 13, wherein two slide rail fixing blocks are arranged in a horizontal direction, both the two slide rail fixing blocks being sleeved on the linear slide rail.

15. The automobile calibration device according to claim 11, wherein the adjusting member comprises a rod body, a knob portion and the gear, wherein
- the rod body passes through the sliding member, the rod body being movably installed on the sliding member and the rod body being capable of rotating relative to the sliding member; and
- the gear and the knob portion are respectively disposed on two ends of the rod body.

16. The automobile calibration device according to claim 11, wherein
- the rack gear is strip-shaped and disposed in a horizontal direction, the rack gear comprising a plurality of gear tooth disposed in a vertical direction; and
- the gear is a spur gear, the gear meshing with the gear tooth of the rack gear.

17. The automobile calibration device according to claim 8, further comprising a sliding apparatus, wherein the sliding apparatus is installed on the fixing plate.

18. The automobile calibration device according to claim 17, wherein the sliding apparatus comprises a guide rail and a sliding assembly, wherein
- the guide rail is installed on the fixing plate; and
- the sliding assembly is installed on the guide rail, the sliding assembly being movable horizontally relative to the guide rail.

19. The automobile calibration device according to claim 18, wherein
- the guide rail comprises a first surface and a second surface that are perpendicular to each other, the first surface being provided with a first sliding groove, the second surface being provided with a second sliding groove, and the first sliding groove and the second sliding groove being disposed in parallel;
- the sliding assembly comprises a plate body, a first sliding member and a second sliding member, the first sliding member and the second sliding member being installed on the plate body; and
- the first sliding member is movably installed on the first sliding groove), the first sliding member being movable along the first sliding groove, the second sliding member being movably installed on the second sliding groove and the second sliding member being movable along the second sliding groove, so that the plate body is slidable along the guide rail.

20. The automobile calibration device according to claim 18, wherein the sliding apparatus further comprises a mounting assembly, the mounting assembly being installed on the sliding assembly, configured to mount a calibration assistance device.

* * * * *